United States Patent [19]

Taurand

[11] Patent Number: 5,745,351
[45] Date of Patent: Apr. 28, 1998

[54] DC-TO-DC BIDIRECTIONAL VOLTAGE CONVERTERS AND CURRENT SENSOR

[75] Inventor: Christophe Taurand, Valence, France

[73] Assignee: Sextant Avionique, Velizy Villacoublay, France

[21] Appl. No.: 583,772

[22] Filed: Jan. 11, 1996

[30] Foreign Application Priority Data

Jan. 13, 1995 [FR] France .................... 95 00541

[51] Int. Cl.$^6$ .................... H02M 3/00; H02M 3/335; H02M 7/537
[52] U.S. Cl. .................... 363/20; 363/16; 363/131
[58] Field of Search .................... 363/20, 21, 16, 363/97, 127, 131

[56] References Cited

U.S. PATENT DOCUMENTS

| | | |
|---|---|---|
| 3,986,097 | 10/1976 | Woods . |
| 4,347,474 | 8/1982 | Brooks et al. . |
| 4,600,984 | 7/1986 | Cohen . |
| 4,736,151 | 4/1988 | Dishner . |
| 5,019,770 | 5/1991 | Harada et al. .................... 363/16 |
| 5,038,266 | 8/1991 | Callen et al. .................... 363/127 |
| 5,099,406 | 3/1992 | Harada et al. .................... 363/20 |
| 5,140,509 | 8/1992 | Murugan .................... 363/127 |
| 5,402,329 | 3/1995 | Wittenbreder, Jr. .................... 363/16 |

Primary Examiner—Peter S. Wong
Assistant Examiner—Bao Q. Vu
Attorney, Agent, or Firm—Plevy & Associates

[57] ABSTRACT

A bidirectional voltage converter comprises an inductive element, a primary circuit having a first chopping switch and a first diode, and at least a secondary circuit having a second chopping switch and a second diode. The first switch is switched on upon reception of a start-up signal of the primary period, and switched off when the current in the primary circuit is higher than a control signal. The second switch is switched on upon reception of a start-up signal of the secondary period, to calculate the duration of the secondary period, to count this duration, and switched off when this duration is ended.

18 Claims, 11 Drawing Sheets

(Prior Art - Figs 4a to 4j)

DC-TO-DC BIDIRECTIONAL VOLTAGE CONVERTERS AND CURRENT SENSOR

BACKGROUND OF THE INVENTION

1. Field of the Invention

The present invention relates to switching power supplies, and more particularly to DC-to-DC voltage converters with inductive storing. Such converters, which transform DC voltages, have many industrial applications, especially in aeronautics, where they are used to generate, from the DC power supply of an aircraft, voltages of 5 volts, +12 volts, +15 volts, and so on, to supply various electronic devices.

2. Discussion of the Related Art

Generally, the operation of inductive storing converters is based on energy transfer cycles including a period of accumulation of magnetic energy in an inductive device, through a primary circuit, followed by a period of restitution of this energy in a load, through a secondary circuit. A converter whose inductive element is a single winding inductance is referred to as a "buck-boost" converter, and a converter whose inductive element is a transformer including at least two windings is referred to as a "fly-back" converter.

In this field the present invention more particularly relates to bidirectional voltage converters, which can transform energy both from the primary to the secondary and from the secondary to the primary. Such bidirectional converters are particularly adapted to supply complex loads (capacitive and/or inductive), accumulators or reversible devices such as electric motors, liable to feed back energy to the converter.

Exemplary bidirectional converters with inductive storing are described in U.S. Pat. No. 3,986,097 relative to fly-back converters, and in U.S. Pat. No. 4,736,151 and European patent application 336,725 relative to buck-boost converters.

A general object of the present invention is to improve bidirectional converters, whose operation will be first described.

FIG. 1a is a basic diagram of a conventional bidirectional buck-boost converter. Such a converter includes, on both sides of an inductance L, a primary circuit and a secondary circuit. The primary circuit includes a diode Dp and a chopping switch Tp that are connected in parallel, and interposed between a voltage source Vin and the inductance L. Similarly, the secondary circuit includes a diode Ds and a chopping switch Ts interposed between the inductance L and an output capacitor Cout. Capacitor Cout ensures smoothing of the converter output voltage Vout applied to a load Z. In practice, the switches Tp, Ts are electronic switches such as MOS or bipolar transistors.

As mentioned above, an operating cycle of the converter includes two periods, i.e. a first accumulation or storing period, having a duration Ton, during which a current Ip flows in the primary, and a second restitution or restoring period, having a duration Toff, during which a current Is flows in the secondary. FIG. 2 represents the total current I flowing through the inductance L during a cycle. In bidirectional operation mode, the storing period Ton in fact has a first phase Ton1 for restoring in the voltage source Vin an excess energy stored in inductance L during a previous cycle, followed by a second phase Ton2 for the effective storing of a magnetic energy in inductance L. FIGS. 1b and 1c are equivalent circuit diagrams of the converter during phases Ton1 and Ton2. During the phase Ton1, the inductance L generates the current Ip which is negative (diode Dp conductive—FIG. 1b). When this energy has been entirely restored, the storing phase Ton2 begins, where Ip is positive (Tp on, diode Dp blocked—FIG. 1c). Similarly, the so-called restoring phase Toff includes a first phase Toff1 for effectively restoring in capacitor Cout and in load Z the energy stored by inductance L during the phase Ton2, followed by a phase Toff2 of storing in inductance L an energy in excess provided to the capacitor Cout or to the load Z during the phase Toff1. FIGS. 1d and 1e are equivalent circuit diagrams of the converter during the phases Toff1, Toff2. It can be noted that the secondary current It is positive during the phase Toff1 (diode Ds conductive—FIG. 1d), then negative during Toff2 (Ts on, diode DS blocked—FIG. 1e), the load Z or the capacitor Cout behaving like a voltage generator. The energy stored during Toff2 is transmitted to the voltage source Vin during the phase Ton1 of the next cycle, which is a characteristic of a bidirectional operation.

A drawback of such a converter is that its efficiency decreases when the operation frequency increases, while, conversely, it is more advantageous to select high operation frequencies, ranging from 100 kHz to 1 MHz, to reduce the size and the bulkiness of the converter.

It is well known that the decrease of the efficiency with the increase of the operation frequency is especially caused by loss of energy in the switches during the switching periods. It will be noted that the energy lost in a switch during switching is equal to the product of the voltage across the switch by the current flow and the switching time. Switching-on losses and switching-off losses should be distinguished. In a converter operating in a bidirectional mode as represented in FIG. 2, the problem of switching-on losses of switches Tp, Ts is theoretically solved provided that each switching on is preceded by a conduction period of diodes Dp, Ds ensuring a switching-off voltage close to 0 (diode voltage). In contrast, each switching-off of a switch Tp, Ts causes the inductive element to react whereby the voltage across the switch increases abruptly, which in turn increases the switching-off duration through Miller effect. This phenomenon causes a loss of energy in the switches that is all the more significant as it occurs many times per second when the frequency is high. In addition, the abrupt increase in the voltage at the switching off generates spurious electromagnetic radiation. The same drawbacks occur in a fly-back transformer converter.

To avoid this drawback, one has proposed low-loss converters, in which the voltage edges occurring at the switching-off of the primary and secondary switches are smoothed by the addition of so-called "smooth-switching" capacitors.

FIG. 3 represents a low-loss fly-back converter 10. The converter 10 is, for example, of the type represented in FIG. 15 of European patent application 336,725. The converter 10 differs from the converter of FIG. 1 by the addition of two smooth switching capacitors Cp, Cs and by a specific operation mode including two transition periods which will be described hereinafter. Capacitor Cp is connected in parallel with the diode/switch circuit Dp/Tp of the primary and capacitor Cs is connected in parallel with the diode/switch circuit Ds/Ts of the secondary. In addition, since the converter is of the fly-back type, the inductance L of FIG. 1 is replaced with a transformer 1 which includes a primary inductance Lp formed by a winding of Np turns, and a secondary inductance Ls formed by a winding of Ns turns.

The operation of the converter is illustrated in FIG. 4. FIGS. 4a and 4b represent control signals Hp and Hs applied to switches Tp and Ts, respectively. FIGS. 4c and 4d represent currents Ip and Is respectively flowing through the primary Lp and the secondary Ls inductances of the transformer. FIGS. 4e and 4f represent voltages VTp and VTs across switches Tp and Ts. FIGS. 4g and 4h represent charge and discharge currents Icp and Ics of the capacitors Cp and Cs. FIGS. 4i and 4j represent spurious currents Iop and Ios, which are added to the primary Ip and secondary Is currents represented in FIGS. 4c and 4d.

As shown in FIG. 4, each operation cycle of converter 10 includes four distinct periods designated by their respective time durations T1, T2, T3 and T4.

Periods T1 and T3 are similar to periods Ton and Toff described above, except that the respective currents of the primary Ip and of the secondary Is flow through distinct windings Lp and Ls. Thus, period T1 comprises a restoring period at the primary where current Ip is negative (FIG. 4c—diode Dp conductive, Tp on or off), followed by a storing phase where current Ip is positive (diode Dp blocked, Tp on, Hp=1). Conversely, period T3 first includes a restoring phase at the secondary where current Is is positive (diode Ds conductive, Ts on or off) followed by a storing phase where current Is is negative (FIG. 4d—diode Ds blocked, Ts on, Hs=1). As represented by dotted lines in FIGS. 4a, 4b (during periods T1 and T3) there is an operation margin to turn on switches Tp and Ts, as long as diodes Dp and Ds are conductive.

The periods T2 and T4 are transition periods of short duration during which Tp and Ts are maintained off. In FIG. 4, T2 and T4 are not drawn to scale and are in fact of the order of 1/10 or 1/100 of T1 and T3. During these transition periods, capacitor Cp is discharged and capacitor Cs is charged, and conversely (FIGS. 4g and 4h). Diodes Dp, Ds are blocked, the energy stored in the transformer is not conveyed to the primary nor to the secondary.

Those skilled in the art will notice that the smooth switching capacitors Cp and Cs should not be mistaken for capacitors existing in so-called resonance converters, whose operation principle cannot be compared with the operation of the related inductive storing converters. Here, capacitors Cp and Cs are not means for transferring energy through the converter. On the contrary, capacitor Cp, Cs are selected so as to have charging and discharging periods T2 and T4 that are short with respect to periods T1 and T3 during which the energy is transferred within the converter.

The advantage of adding transition periods T2 and T4 and to use smooth switching capacitors Cp and CS is that, at the switching off of a switch Tp or Ts, the capacitor Cp or Cs associated with the switch is progressively charged and prevents voltage VTp or VTs from abruptly rising. As represented in FIGS. 4e and 4f, voltage VTp or VTs of the switch increases during the transition period T2 or T4 until it reaches its maximum value, which is equal to Vin+Vout*Np/Ns for VTp, and Vout+Vin*Ns/Np for VTs. The switching-off losses due to Miller effect are eliminated, or at least significantly reduced.

However the above converters have other drawbacks that will be described hereinafter.

Drawbacks caused by the use of smooth switching capacitors

The applicant has first noticed that despite smoothing of the rising/falling edges of VTp and VTs, the switchings still generate spurious electromagnetic radiation. More particularly, it has been noticed that these radiation are generated by spurious currents Iop, Ios due to a spurious oscillation phenomenon between the smooth switching capacitors Cp, Cs and spurious inductances present in the converter, which can be represented as a first inductance Ip in series with Lp and a second inductance Is in series with Ls (FIG. 3). The currents Iop and Ios, represented in FIGS. 4i and 4j, occur after each switching of switches Tp, Ts, follow an oscillating state which slowly damps, and have a peak intensity which can be equal to the maximum values reached by Ip and Is at the end of T1 and T3. The current Iop flows in the whole loop formed by the primary circuit, including inductance Lp, the diode/switch/capacitor circuit Dp/Tp/Cp and the voltage source Vin, as well as the electrical connections between these elements. Similarly, the current Ios flows in the whole loop formed by the secondary. Thus, each primary or secondary loop generates an electromagnetic radiation due to an antenna effect, proportional to a magnetic flux $\Phi=S*\beta$, where $\beta$ is the magnetic field generated by the spurious current and S is the surface area of the loop.

SUMMARY OF THE INVENTION

A first object of the invention is to attenuate the effect of these spurious currents, and to provide a converter structure with low radiation.

To achieve this object, the present invention modifies the disposition of the smooth switching capacitors and connects them in parallel to the terminals of the inductive element of the converter. This is advantageous both in that the smooth switching function of the capacitors is maintained and in that the smooth switching capacitors form, with the primary and secondary inductances, loops having a reduced surface and length within which the two oscillation currents Ios, Iop are confined. Thus the magnetic flux $\Phi$ and the spurious radiation are significantly decreased.

Drawbacks of Conventional Control Devices

Generally, the voltages provided by the bidirectional converters are stabilized through a system for controlling the primary Tp and secondary Ts switches, which permanently controls the output voltage Vout and compares it with a reference voltage Vref. The aim is to maintain the output voltage Vout constant, by controlling switches Tp and Ts and the conduction periods T1 and T3 in the primary and secondary windings.

In a converter in a stabilized state, periods T1 and T3 are correlated in accordance with a general relation which can be found as follows:

(a) during T1, the height $\Delta Ip=Ip2-Ip1$ of the current ramp flowing through the primary winding Lp is expressed by:

$$\Delta Ip=Vin*T1/Lp \qquad (1),$$

Ip2 being the positive current at the end of the period T1, Ip1 being the negative current at the beginning of the period T1 (FIG. 4c), Vin being the input voltage Vin, and Lp being the inductance of the primary winding.

(b) similarly, during T3, the height $\Delta Is=Is1-Is2$ (FIG. 4d) of the current ramp flowing through the secondary winding Ls is expressed by:

$$\Delta Is=Vout*T3/Ls \qquad (2),$$

(c) the general principle of the conservation of the energy E in a transformer allows to write that the energy stored at the end of a phase is equal to the energy transmitted at the beginning of the next phase. This is expressed by the following relations:

$$E=\tfrac{1}{2}*Lp*(Ip2)^2=\tfrac{1}{2}*Ls*(Is1)^2$$

for the passage from T1 to T3, and $$E = \tfrac{1}{2} \cdot Ls \cdot (Is2)^2 = \tfrac{1}{2} \cdot Lp \cdot (Ip1)^2 \quad (3)$$

for the passage from T3 to T1.

In addition, since in a transformer, Lp=A1*Np2 and Ls=A1*Ns2, where A1 is a constant, it is deduced that:

$$Np \cdot \Delta Ip = Ns \cdot \Delta Is \quad (4),$$

(d) by combining the last relation with the equations (1) and (2) of ΔIp and ΔIs written in (a) it is deduced that:

$$Vout/Vin = NsT1/NpT3 \quad (5).$$

This relation provides the ratio between the input voltage Vin and the output voltage Vout, this ratio being assumed to be constant in the case of a converter in a stabilized state. Of course, this relation relates to a transformer fly-back converter; in the case of a buck-boost converter Ns/Np=1;

Equation (5) can also be written as follows:

$$T3/T1 = Ns\ Vin/Np\ Vout \quad (6)$$

Thus, the ratio T3/T1 is always constant for a stabilized output voltage Vout and a constant input voltage Vin, whatever be the control process that is implemented.

Exemplary control devices based on this general operation principle are described in European patent application 336 725 mentioned above, with relation to FIGS. 12, 14a, 15 of this application. According to the prior art, it is known to control the switching-on duration of the primary switch Tp from an error signal ε generated by the comparison between the output voltage Vout with a reference voltage Vref. Also, it is known to trigger the switching off of the secondary switch Ts (which indicates the end of period T3) when the current Is flowing in the secondary exceeds a predetermined threshold (current control at the secondary), or when the output voltage Vout decreases below a predetermined value.

One of the drawbacks of the known control devices is that they do not ensure optimum efficiency over a wide range of values of the input voltage Vin. FIG. 5 illustrates the efficiency as a function of the variations of the input voltage of a conventionally controlled converter. It can be seen that the efficiency, which is optimum for a nominal value of the input voltage, decreases when Vin increases. This phenomenon is assumed to be due to an increase in the amplitude of the ramps of currents ΔIp, ΔIs in the converter and to loss of energy through Joule effect. This drawback is particularly impairing when the current source is not steady. For example, in the case of an aircraft, the nominal voltage Vin provided by the network of the aircraft is approximately 28 volts but can vary between 12 volts and 36 volts or more (up to 80 volts in the case of failure of the network). Under such operating conditions, the efficiency of the converter is difficult to control.

Another drawback of some known control systems is that they are based both on the control of the primary current Ip and on the control of the secondary current Is, and to require at least two current sensors, the one at the primary and the other at the secondary.

A second object of the invention is to provide a control device for a bidirectional converter which has the following advantages:

- optimum efficiency over a wide range of values of the input voltage Vin, in the case of a non-constant voltage Vin,
- regulation of the output voltage Vout over a wide range of values while maintaining an optimum efficiency,
- control of the current on a single side of the circuit, to limit the number of current sensors. It will be preferably the current Ip on the primary side, for practical reasons: detecting a possible overload problem and controlling the start-up at the powering on,
- fully symmetrical operation: possibility of receiving at the output a load providing a current.

To achieve this object, the present invention provides a method for controlling a voltage converter including a first inductive element for storing energy in a magnetic form, a first chopping switch and a first diode in parallel, which form with the inductive element a primary circuit connected to a DC supply voltage source, at least a second chopping switch and a second diode in parallel, which form with the inductive element at least a secondary circuit providing a load with an output voltage of the converter. The method consists of controlling the switches to achieve operation cycles of the converter so that each cycle includes a primary period during which the first switch is on and the second switch is off, and a secondary period during which the second switch is on and the first switch is off. The duration of the secondary period is determined by a calculation means, the switching-off of the secondary switch is triggered when the calculated duration of the secondary period is ended.

Advantageously, the duration of the secondary period is calculated from a set of parameters including at least a parameter corresponding to the supply voltage, a parameter corresponding to the output voltage of the converter, and a value of a maximum current at the output of the converter.

According to an embodiment of the invention, the parameter corresponding to the supply voltage is the supply voltage drawn at the converter input.

According to an embodiment of the invention, the parameter corresponding to the output voltage of the converter is the voltage drawn at the output of the converter.

Advantageously, the duration of the primary period is determined by the switching-off of the first switch, which is triggered when a current in the primary circuit is higher than a control signal depending upon the difference between the output voltage of the converter and a reference voltage.

According to an embodiment of the invention, a first delay is interposed between the end of the primary period and the beginning of the secondary period, the switching-on of the second switch and the counting of the duration of the secondary period being triggered at the latest at the end of the first delay. A second delay is interposed between the end of the secondary period and the beginning of the primary period, the switching-on of the first switch being triggered at the latest at the end of the second delay.

According to an embodiment of the invention, delays are predetermined and generated by delay circuits.

According to an embodiment of the invention, delays are calculated from a set of parameters including the supply voltage of the converter, the output voltage of the converter, the value of the current flowing through the primary circuit at the end of the primary period, and the duration of the secondary period.

The present invention also relates to a voltage converter including an inductive element adapted to store energy in a magnetic form, a first chopping switch and a first diode in parallel, which form with the inductive element a primary circuit connected to a DC supply voltage source, at least a second chopping switch and a second diode in parallel, which form with the inductive element at least a secondary circuit supplying a load with an output voltage of the converter, a system for controlling switches to achieve operation cycles including a primary period for the flowing of a current through the primary circuit, during which the first switch is on and the second switch is off, and a secondary period for the flowing of a current through the secondary circuit, during which the second switch is on and the first switch is off. The converter includes means for switching on the first switch upon reception of a start-up signal of the primary period, and for switching off the switch when the current in the primary circuit is higher than a control signal depending upon the difference between the output voltage of the converter and a reference voltage, means for switching on the second switch upon reception of a signal to start-up the secondary period, to calculate the duration of the secondary period, to count this duration and to switch-off the secondary switch when this duration is ended.

According to an embodiment of the invention, the converter further includes a first timer for providing with a first delay the start-up signal of the secondary period, from the end of the primary period, a second timer for providing with a second delay the start-up signal of the primary period, from the end of the secondary period.

Advantageously, a smooth switching capacitor is associated with each switch. The smooth switching capacitor is connected in parallel across the inductive element, so as to form, with a spurious inductance of the inductive element, a circuit loop having a reduced length in which is confined a spurious current.

According to an embodiment of the invention, the inductive element is a single turn winding.

According to an embodiment of the invention, the inductive element is a transformer including a primary winding forming the primary circuit with the first switch and the first diode, and a secondary winding forming the secondary circuit with a second switch and the second diode.

Drawbacks of Current Sensors used to Control Currents Flowing in a Voltage Converter As indicated above, the control of a converter requires to control the currents flowing in the converter. This control can be achieved through current sensors. Because of the high operation frequencies and of the currents which can be important, it is desired to use current sensors having low energy loss and a short response time.

FIG. 6 shows a current sensor 20 conventionally used in voltage converters or similar devices. This current sensor includes a transformer 21 having a primary winding Wp flown by a current ip to be measured, and a secondary winding Ws for measuring current ip. The secondary winding Ws is connected, through a diode 22, to a measurement resistor r. An impedance 23 for demagnetizing the transformer 21 (for example, a Zener diode or a high value resistance) is connected in parallel to the terminals of Ws. During a measurement period, the current ip flows through winding Wp and a current is, proportional to ip, occurs in winding Ws, the proportionality ratio, between currents ip and is, is determined by the ratio of the number of turns of Ws and Wp. The current flows through diode 22 and generates, across the terminals of the measurement resistor r, a voltage V=r*is which represents the current ip to be measured. This measurement period must necessarily be followed by a quiescent period, during which the current i must be zero, so that the transformer 21 is demagnetized. During the quiescent period, demagnetization is ensured by impedance 23, across the terminals of which occurs a reverse biased voltage. Without a quiescent period, a voltage with an increasing error would occur at the output of the current sensor, caused by the storing of a magnetizing current in transformer 21 and to saturation of the latter.

The main drawback of this conventional current sensor is that it can detect a current only in one direction, imposed by diode 22. In addition, the magnetic core of the sensor is very rapidly saturated when a current, reverse with respect to the normal detection direction, flows through the primary winding Wp. This is particularly impairing when it is desired to measure, in a bidirectional converter, the positive values of the primary current Ip. Since current Ip is negative before being positive, the sensor is first flown through by a reverse current with respect to the normal detection direction, which rapidly saturates the magnetic core of the transformer 21. Then, when current Ip becomes positive, the output voltage of the sensor, instead of being proportional to Ip is in fact erroneous.

Thus, a further object of the present invention is to provide a current sensor with bidirectional isolation. Such a current sensor can especially, but not exclusively, be used in a bidirectional voltage converter, to measure a current having a polarity that may change during a single measurement period.

To achieve this object, the present invention is based on the fact that, in a switch-controlled system such as a bidirectional voltage converter, there is a relation between the control of the switches and the flow of the current to be measured in a portion of the circuit. Thus, the present invention replaces the diode of the conventional sensor by a switch which is controlled so as to be on when a current to be measured is liable to flow through the primary winding of the sensor, and so as to be off when no current is liable to flow through this winding, in order to ensure demagnetization of the sensor.

More particularly, an embodiment of a converter according to the invention further includes a current sensor for measuring the primary current. The sensor includes a transformer having a primary winding disposed in the primary circuit of the converter, a secondary winding connected to a measurement resistor through a switch, and a demagnetization inductance that is active when the switch is off, and means for switching-on the switch during the primary period.

BRIEF DESCRIPTION OF THE DRAWINGS

By way of non-limiting example, the following description discloses.

exemplary converters with low spurious radiation, complying with the first object of the present invention, a process for controlling a converter complying with the second object of the invention, and exemplary embodiments of control systems according to this process applied to a low-loss converter, and a current sensor according to the present invention, usable especially for detecting a current flowing in a bidirectional converter, with relation to the following figures, among which.

DESCRIPTION OF THE PREFERRED EMBODIMENTS

Bidirectional Voltage Converter with a low Spurious Radiation

Figure 3:
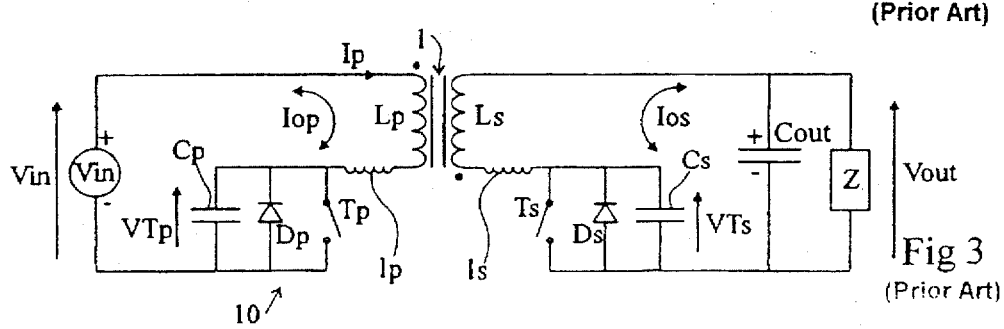
Figure 7:
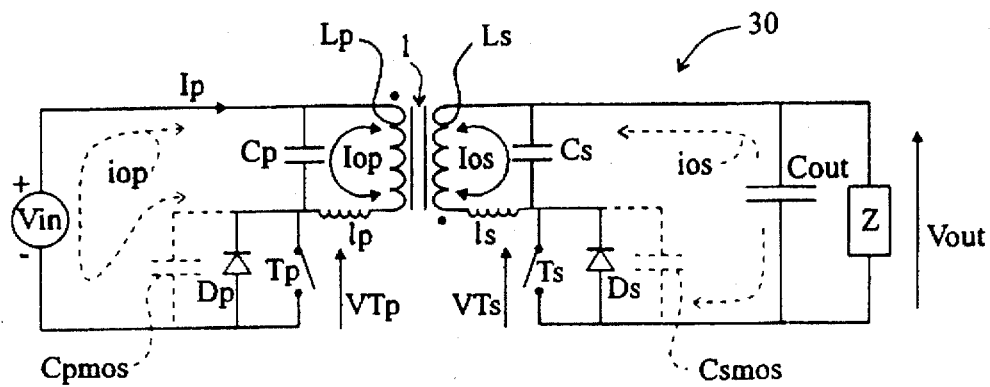
FIGS. 7, 8, 9a and 9b represent electrical diagrams of four bidirectional voltage converters with low spurious radiation, according to the present invention.

FIG. 7 represents a fly-back converter 30 according to the present invention. FIG. 7 shows again the elements of the conventional converter described with relation to FIG. 3, designated with the same references. It is reminded that the object of the present invention is to decrease the electromagnetic radiation caused by spurious currents Iop, Ios generated by a resonance phenomenon between the smooth switching capacitors Cp, Cs and spurious inductances lp, ls present in the converter. According to the invention, the converter 30 differs from the converter of the prior art in that capacitor Cp is connected in parallel across the primary inductance Lp, and capacitor Cs is connected in parallel across the secondary inductance Ls.

As represented in FIG. 7, the advantage of this arrangement is that capacitors Cp, Cs form, with inductances Lp, Ls and their spurious inductances lp, ls two loops with reduced length and surface, one at the primary, the other at the secondary, in which are confined currents Iop and Ios. Thus, current Iop no longer flows through the whole loop formed by the primary circuit with the supply source Vin, and current Ios no longer flows through the loop formed by the secondary circuit with the load Z, these loops being, in practice, relatively important because of the length of the wires. Since spurious electromagnetic radiation is proportional to the surface of each loop, its intensity is significantly decreased.

A further advantage of this arrangement is that the operation of the converter 30 is not modified. Capacitors Cp, Cs still ensure their smoothing function for the rising edges of voltages VTp, VTs across the switches. Thus, all the signals represented in FIG. 4 described above are unchanged.

A still further advantage of the present invention is the possibility of using capacitors Cp, Cs with a low nominal voltage, low cost and reduced size. This advantage will be better understood with the exemplary description of the operation of the primary capacitor Cp. When switch Tp switches from the on state (period T1) to the off state (period T2), the voltage across the primary capacitor Cp, first equal to Vin (VTp=0), decreases, crosses zero, then increases again according to a reverse polarity until it reaches a negative value Vout*Np/Ns imposed by inductance Lp. In the prior art, the voltage of Cp follows the voltage of switch Tp and varies from 0 to +(Vin+Vout*Np/Ns). The voltage range across capacitor Cp is therefore the same; however, the maximum voltage which can be established across its terminals is much lower because of the arrangement according to the present invention. This maximum voltage is equal to Vin, or to Vout*Np/Ns.

Figure 8:
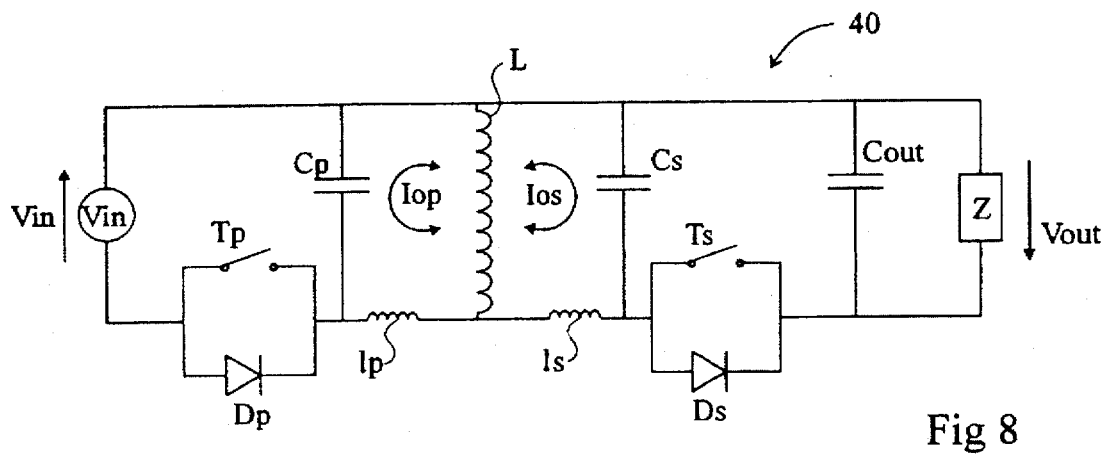
Figure 9A:
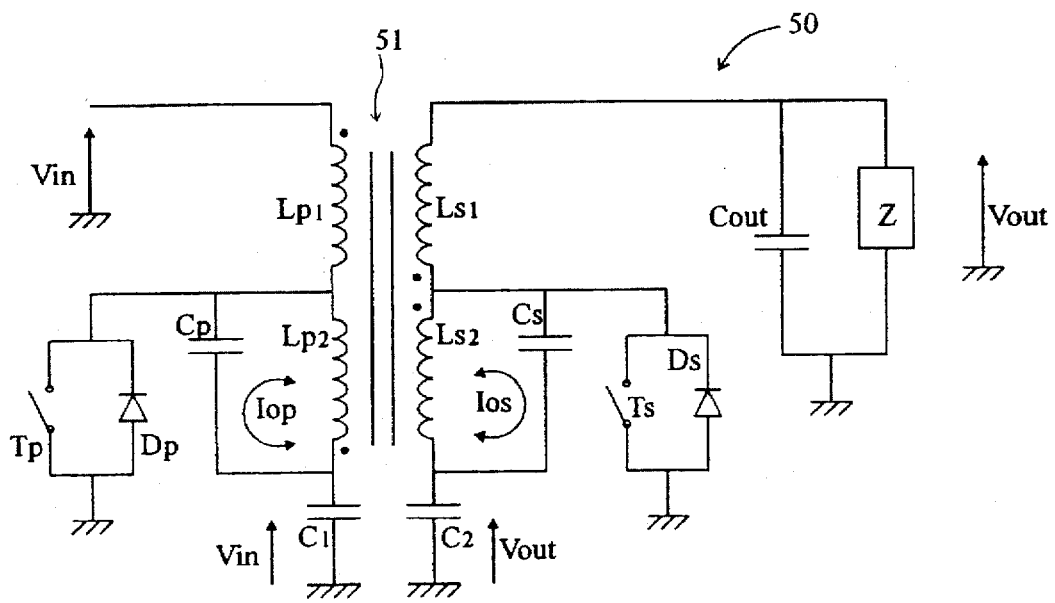
Figure 9B:
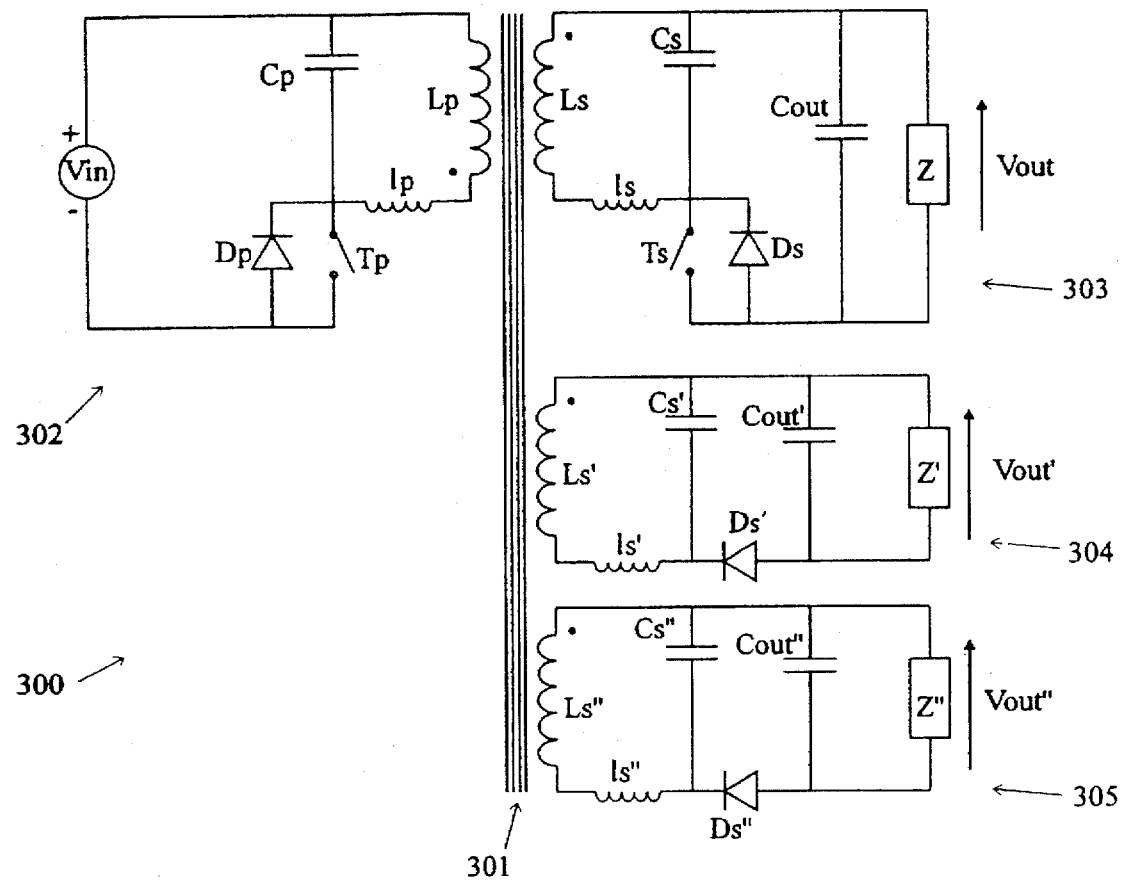

The present invention can apply to other types of low-loss non-resonant converters, as represented in FIGS. 8, 9a and 9b.

Figure 1A:
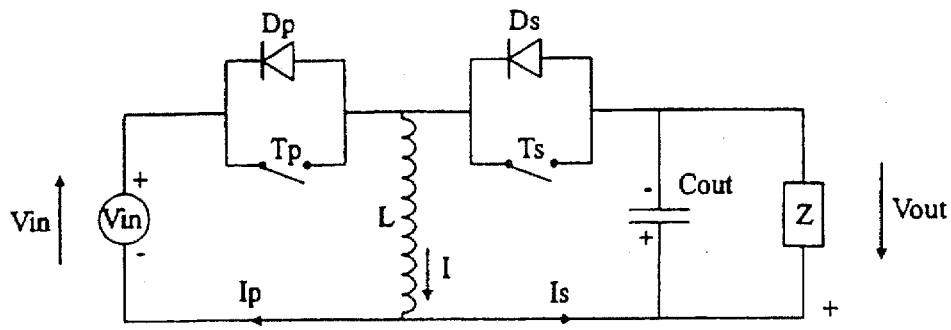
FIG. 1a represents the electrical diagram of a bidirectional voltage converter according to the prior art, of the buck-boost type.
Figures 1B, 1C:
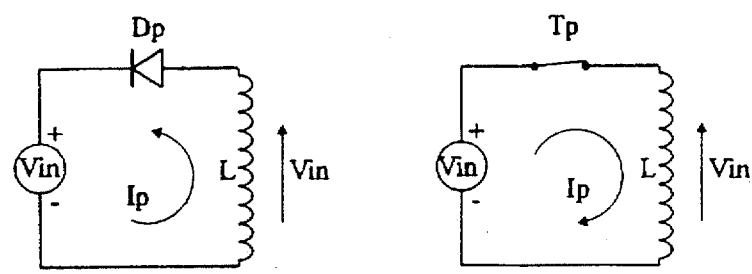
FIGS. 1b–1e are equivalent electrical diagrams of the converter of FIG. 1 during four operation phases.
Figures 1D, 1E:
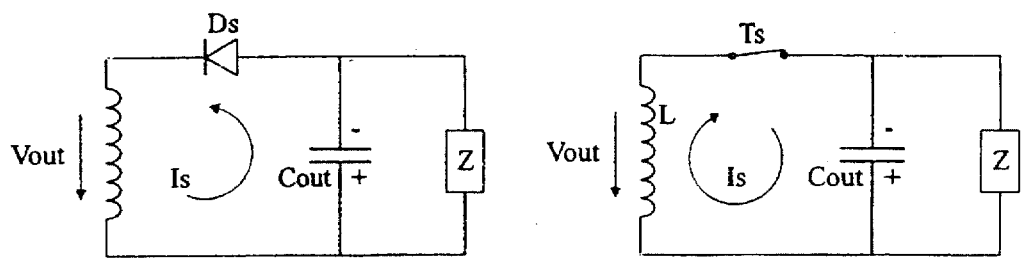
Figure 2:
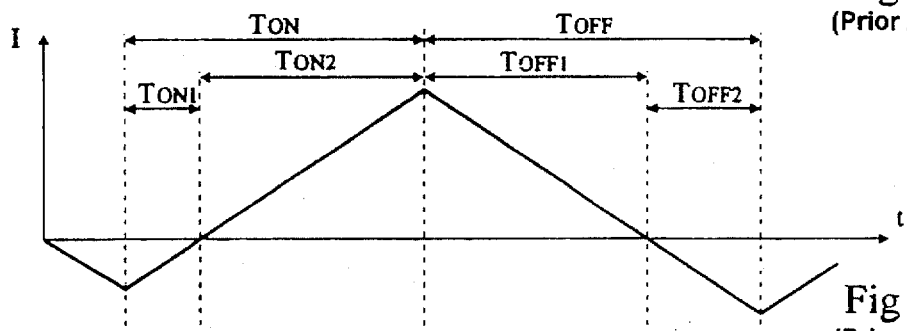
FIG. 2 is a current diagram illustrating the operation of the converter of FIG. 1a, FIG. 3 represents the electrical diagram of a bidirectional low-loss voltage converter according to the prior art of the fly-back type, FIG. 4 includes diagrams 4a–4j representing electrical signals occurring at various positions of the converter of FIG. 3.

FIG. 8 represents a buck-boost converter 40, which includes the same elements as the converter of FIG. 1, designated with the same references. Two spurious inductances lp, ls of the converter, are in series with inductance L, at the primary and at the secondary, respectively. The converter 40 includes two smooth switching capacitors Cp, Cs and operates with a four-period cycle described above. According to the invention, capacitors Cp and Cs are connected in parallel to the terminals of inductance L, Cp being connected to the primary and Cs being connected to the secondary.

FIG. 9a represents an inductive storing converter 50 of a specific type, in which are shown again the primary and secondary switches Tp, Ts and diodes Dp, Ds that are controlled as in the preceding cases. The converter includes a transformer 51 having first and second primary windings Lp1, Lp2 in series, wound in reverse direction, and first and second secondary windings Ls1, Ls2 in series, also wound in reverse direction. At the primary, the input voltage Vin is applied to winding Lp1, winding Lp2 is connected to ground through a first capacitor C1, the pair Tp/Dp is connected between the junction of Lp1 and Lp2 and ground. At the secondary, the output capacitor Cout in parallel with the load Z are connected both to Ls1 and to Ls2 through a second capacitor C2. The pair Ts/Ds is connected between the junction of Ls1 and Ls2 and ground. Since the directions of windings Lp1 and Lp2, Ls1 and Ls2 are inverted at the primary and at the secondary, the voltages across Lp1 and Lp2, Ls1 and Ls2 are mutually canceled. Therefore the input voltage Vin is reproduced across capacitor C1, and the output voltage Vout across capacitor C2. According to the invention, the smooth switching capacitor Cp is connected in parallel with the terminals of the second primary winding Lp2, and capacitor Cs is connected across the second secondary winding Ls2. Considered from its input or from its output, the operation of converter 50 is identical to that of the converter of FIG. 7.

FIG. 9b represents a converter 300 with a plurality of outputs, comprising a transformer 301 including a primary winding Lp and a plurality of secondary windings Ls, Ls', Ls". Each winding is associated with a spurious inductance lp, ls, ls', ls", respectively. First, the converter 300 includes a primary circuit 302 associated with winding Lp and a first secondary circuit 303 associated with the secondary winding Ls. The primary circuit 302 and the first secondary circuit 303 are strictly identical to the primary circuit and the secondary circuit of the converter of FIG. 7, and will not be described again. The converter 300 further includes second 304 and third 305 secondary circuits, associated with windings Ls' and Ls'. The secondary circuits 304 and 305 have the same structure as the secondary circuit 303 but do not include switches. Winding Ls" is connected to a load Z' through a diode Ds' and a filtering capacitor Cout'. Winding Ls" is connected to a load Z" through a diode Ds" and a filtering capacitor Cout". According to the invention, a capacitor Cs' is connected to the terminals of Ls' and a capacitor Cs" is connected to the terminals of Ls".

Those skilled in the art will notice that, in the various converters described above, the use of MOS transistors as switches Tp, Ts does not prevent from gaining the advantages of the invention. MOS transistors Tp, Ts exhibit at their terminals spurious capacitances Cpmos, Csmos inherent in the MOS technology and represented by way of example in doted lines in FIG. 7. Then, because of oscillation between Cpmos and Csmos and the inductances lp, ls, spurious currents iop, ios occur and flow through the whole primary and secondary circuit, and such currents may generate important spurious radiation. In fact, the currents iop and ios are part of the currents Iop and Ios confined in the loops of reduced length according to the invention, and are proportional to the latter according to ratios equal to Cpmos/cp for iop, and Csmos/Cs for ios. Since Cpmos and Csmos are low and approximately 500 pF, it is sufficient to select higher values for the capacitors Cp and Cs, for example 5 times Cpmos or Csmos so that ios and iop are negligible.

Method and System for Controlling Bidirectional Voltage Converters

As indicated formerly, the second object of the invention is to provide a process and a device for controlling a bidirectional converter with the following advantages:

optimum efficiency over a wide range of values of the input voltage Vin, regulation of the output voltage Vout on a wide range of values while maintaining an optimum efficiency, control of the current at the primary, to limit the number of current sensors, perfect bidirectional operation.

Figure 10:
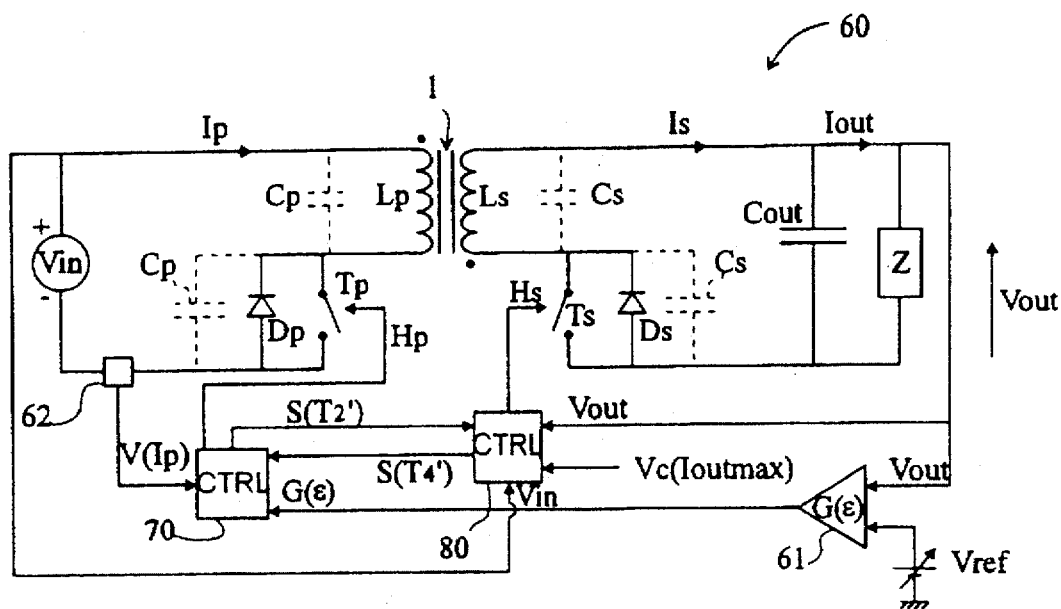
FIG. 10 represents the electrical diagram of a bidirectional voltage converter and block diagrams of a system for controlling this converter according to the present invention.

FIG. 10 represents a fly-back converter 60 according to the present invention. The structure of the converter 60 does not differ from that of the conventional converter of FIG. 3. All the elements above described are again represented, namely, the transformer 10 and the two inductances Lp, Ls, the primary switches Dp/Tp and secondary switches Ds/Ts, the output capacitor Cout, load Z, and the voltage source Vin. The smooth switching capacitors Cp, Cs can be conventionally disposed as represented in doted lines, i.e., conventionally or in the manner described above.

The converter 60 is controlled by a control system according to the invention which includes an amplifier 61, a circuit 70 providing a control signal Hp for controlling the primary switch Tp, and a circuit 80 providing a control signal Hs for controlling the secondary switch Ts. The amplifier 61 is a conventional servo loop amplifier. The amplifier 61 receives at its input the output voltage Vout from converter 60 and an adjustable reference voltage Vref, and provides circuit 70 with a voltage G($\epsilon$) which is a function of the shift or error $\epsilon$ between voltage Vout and the reference voltage Vref. The circuit 70 further receives a voltage V(Ip), which represents the current Ip flowing through the primary circuit, and is provided by the current sensor 62 connected in series with the switch Dp/Tp.

Figure 4:
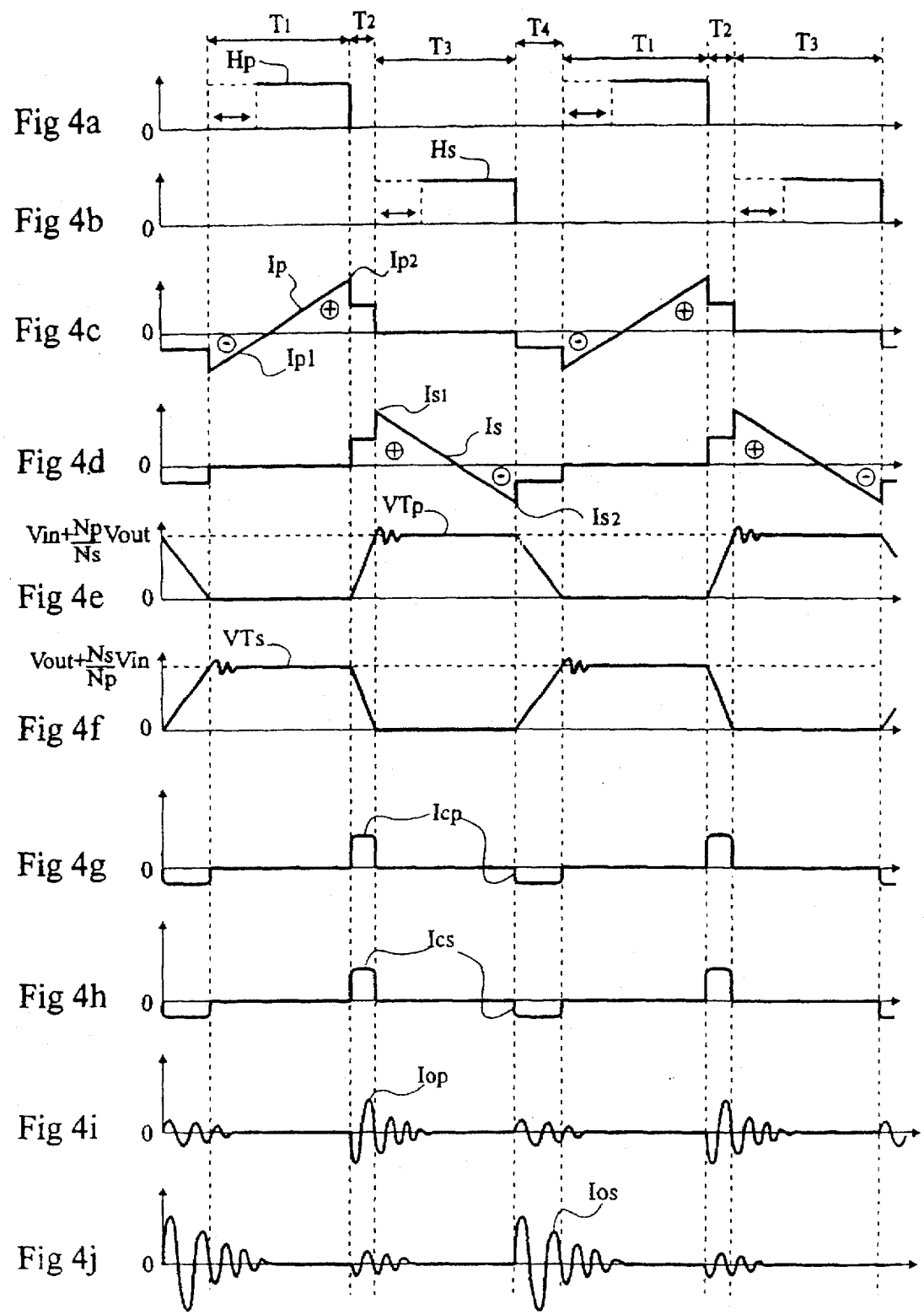
Figure 5:
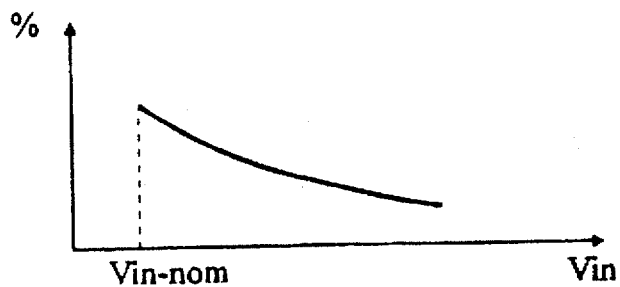
FIG. 5 represents a curve of the efficiency as a function of the input voltage of the bidirectional voltage converters according to the prior art.
Figure 6:
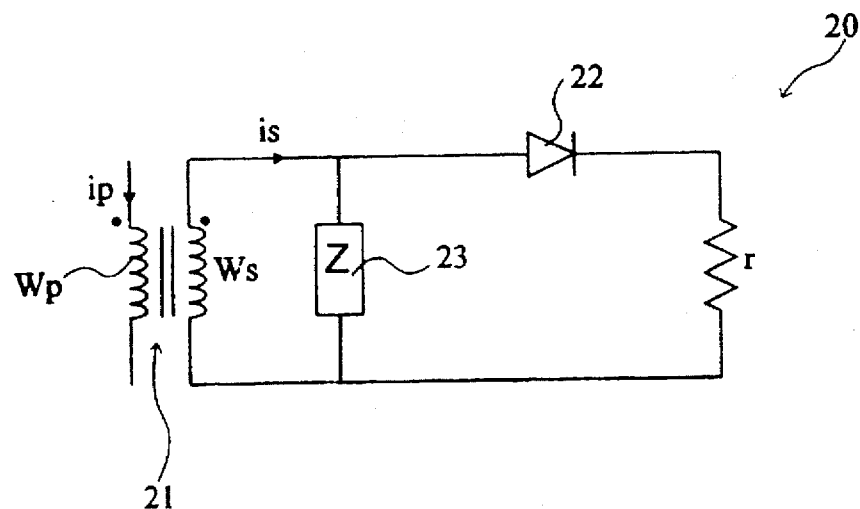
FIG. 6 represents the electrical diagram of a current sensor according to the prior art.

An operation cycle of converter 60 includes periods T1, T2, T3, T4 described with relation to FIG. 4. The converter is controlled by the control system as follows. During period Ti, the primary switch Tp is on and Ts off. The circuit 70 compares V(Ip) with G($\epsilon$) and switches off switch Tp when current Ip in the primary reaches a value such that V(Ip) becomes higher than or equal to G($\epsilon$). Thus, the control mode selected for the primary switch Tp, consists of asserting the maximum current Ip2 (FIG. 4c) of the current ramp in the primary circuit. The switching off of Tp, which corresponds to the end of period Ti, causes the period T2 to begin, during which Tp and Ts remain off. At the end of T2, the circuit 70 transmits a signal S(T2') to the circuit 80. According to the invention, when the circuit 80 receives signal S(T2'), the circuit switches on switch Ts of the secondary and counts a time T3. When counting of T3 is ended, the circuit 80 switches off switch Ts, which corresponds to the beginning of period T4. At the end of T4, the circuit 80 provides circuit 70 with a signal S(T') indicating the end of the period T4, which triggers the next cycle by switching on Tp. After a starting-up period following the powering-on of the converter, Vout is stabilized at a value close to Vref. Thus, the output voltage can be selected by a suitable adjustment of Vref.

A characteristic feature of the present invention which appears in the above description of the control system, is that the switching of f of the secondary transistor Ts is determined only by the counting of time T3. In addition, according to the invention, time T3 is not arbitrarily fixed, but is determined by a relation which provides the desired objects. A method for determining T3 will now be described.

The present invention first provides for searching a relation to write T3 according to the following form:

T3=f(Vin, Vout, Ioutmax), where Vin is the input voltage of the converter, Vout the output voltage and Ioutmax a maximum value of current Iout that can be generated by the converter in load Z, or received from load Z (FIG. 11). Since the operation is bidirectional, this current can be positive (+Ioutmax) or negative (−Ioutmax).

It will be reminded that the above general equations (2) and (6), for the height ΔIs of the current ramp in the secondary (FIG. 4d) and for the ratio between T3 and T1, are as follows:

$$\Delta Is = Is1 - Is2 = Vout * T3/Ls \qquad (2),$$

and $$T3/(5) = Ns\ Vin/Np\ Vout \qquad (6).$$

Since current Is in the secondary has the form of a ramp with a height ΔIs (FIG. 4d), the mean output current Iout provided by the converter can be written:

$$Iout = \tfrac{1}{2}(Is1 + Is2) * T3/(T1 + T3) \qquad (7),$$

neglecting T2 and T4 which should be added to T1 and T3 at the denominator.

Moreover, the current ramp ΔIs flowing through the secondary must not be arbitrary, and can be defined from the following requirements:

(A) if a smooth switching is desired at the switching-on of the switches, diodes Dp and Ds must be conductive at each cycle before turning on the switches, at least during a very short time. This means that a period of reverse current Is must be provided. In other words, Is1 must always be positive, even though Is1 is very close to 0, and Is2 always negative, even though Is2 is very close to 0.

(B) if a maximum and homogenous efficiency is desired while limiting the Joule effect and iron losses, the height ΔIs of the current ramp Is must be controlled and included within a predetermined range.

(C) a simple way to obtain the result desired at (B) is to search for a control mode ensuring that the height of the current ramp ΔIs is a constant independent from the output current Iout, for constant values of Vin, Vout.

From the three conditions (A), (B), (C) the shape of the current ramp ΔIs can be defined as represented in the diagrams of FIG. 11. FIG. 11(a) represents an extreme case which corresponds to a maximum output current Iout (Iout=+Ioutmax, maximum load at the output). In this case, Is2 is very close to 0 but negative, the current Is1 reaches the upper limit of a range delimited by values +ΔIs and −ΔIs, and it can be seen that Is1=+ΔIs. FIG. 11(b) shows another extreme case, reverse to the first one, it is the case of a load Z which restores energy in the converter (Iout=−Ioutmax). Is1 is close very to 0 but positive, Is2 reaches the lower limit of the range and Is2=−ΔIs. FIG. 11(c) represents a mean case where the current ramp ΔIs (which is constant as assumed in (C)) is located in the center portion of the range. In this case, the output current Iout is zero,(no load at the output). FIGS. 11d and 11e, which are only given by way of comparison, show current ramps Is entirely positive or entirely negative that the present invention aims at avoiding, as assumed in condition (A). If the case of FIGS. 11d and 11e is achieved, there would be no conduction phase for diodes Dp and Ds and no smooth switching at the switching on of switches Tp, Ts.

ΔIs being now defined, it can be seen that when the output current Iout is maximum (Iout=Ioutmax—FIG. 11a), it can be written:

$$\Delta Is = Is1 \qquad (8).$$

Moreover, still in the case where the output current Iout is maximum, equation (7) becomes:

$$Iout = Ioutmax = \tfrac{1}{2} * Is1 * T3/(T1+T3) \qquad (9)$$

Combining equations (8) and (9), one obtains:

$$Ioutmax = \tfrac{1}{2} * \Delta Is * T3/(T1+T3) \qquad (10).$$

Combining equation (6) with equation (10), one obtains:

$$Ioutmax = \tfrac{1}{2} * \Delta Is * Nsp * Vin/(Vout + Nsp * Vin) \qquad (11),$$

where Nsp represents the ratio Ns/Np.

Combining equation (11) with equation (2), one obtains:

$$T3 = 2(Ioutmax * Ls/Vout) * (Vout + Nsp * Vin)/(Nsp * Vin) \qquad (12)$$

Thus the desired relation T3=f(Vout, Vin, Ioutmax) is obtained and achieved by the circuit 80 of FIG. 10. Since Ls and Nps are constant, they are taken into account in the design of circuit 80. Since parameters Vin, Vout and the reference value Ioutmax are variable, equation (12) can be implemented according to the alternatives described hereinafter.

A first alternative consists of calculating T3 from two fixed parameters Vin# and Vout#, Vin# being equal to the minimum voltage that the supply voltage source Vin is supposed to supply, Vout# being considered equal to the reference voltage Vref of the control circuit. In this case, circuit 80 is "blind" and does not "know" the effective operation conditions of the converter. The converter however operates in a satisfactory manner if the input voltage Vin does not vary too much.

A second alternative consists of calculating T3 from the parameter Vout# and the effective value of Vin provided at the input of the converter. In this case, the circuit 80 can be adjusted to withstand important variations of Vin while maintaining an optimum efficiency.

A third alternative consists of calculating T3 from the effective values of Vin and Vout at the input and output of the converter. In this case, the converter operates in a self-adjustable mode, the efficiency remains optimum even in the case of significant variations of Vin or variations of the reference value Vref which determines Vout.

Figure 12:
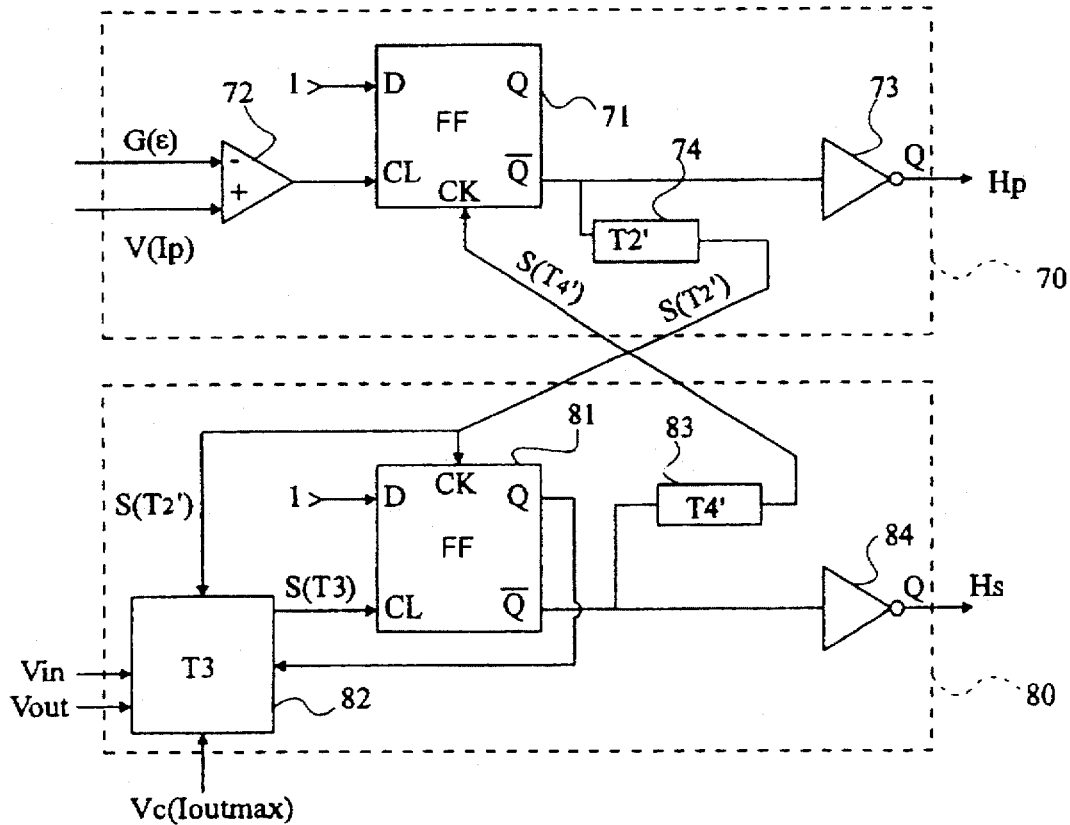
FIGS. 12 and 13 are more detailed electrical diagrams of the block diagrams of FIG. 10.
Figure 11A:
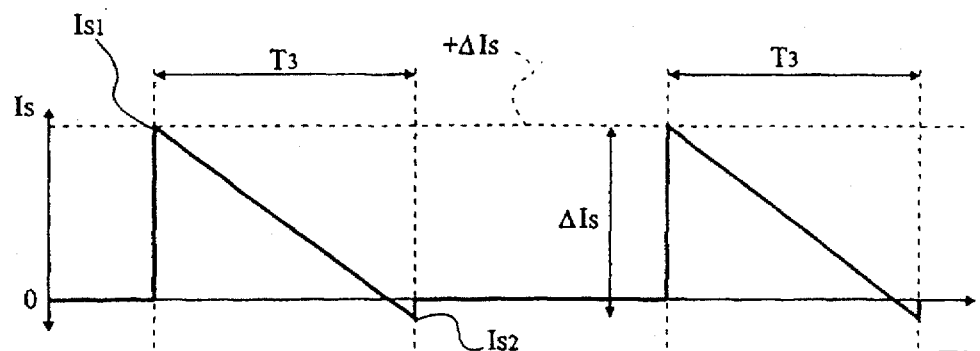
FIG. 11 illustrates a system for controlling a bidirectional converter according to the present invention, diagrams 11a–11e representing ramps of the current in the secondary circuit of a converter.
Figure 11B:
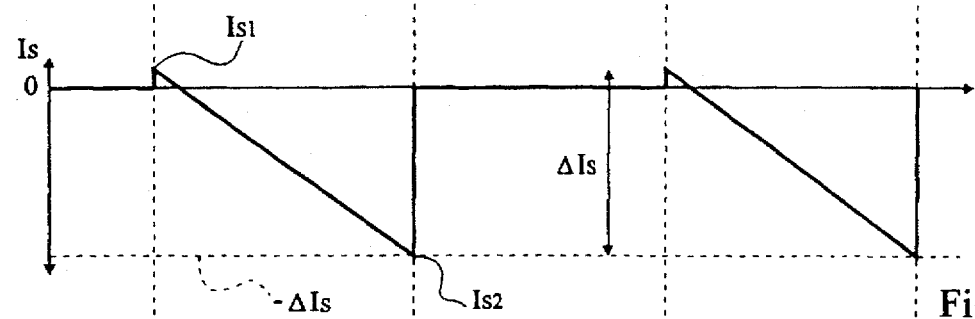
Figure 11C:
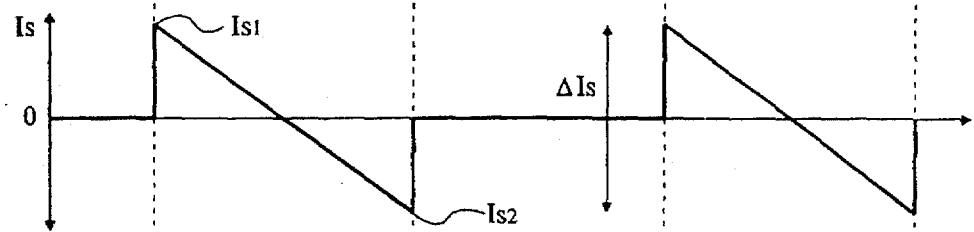
Figure 11D:
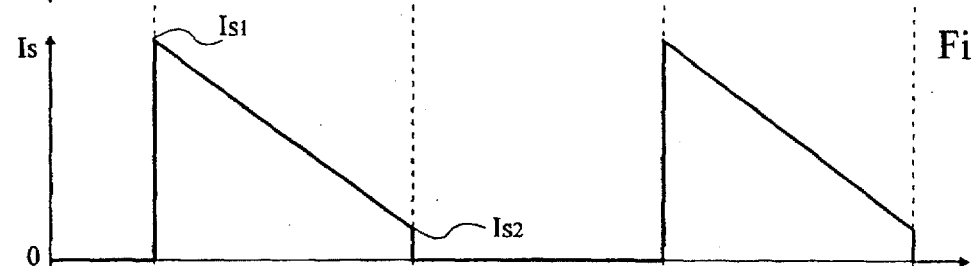
Figure 11E:
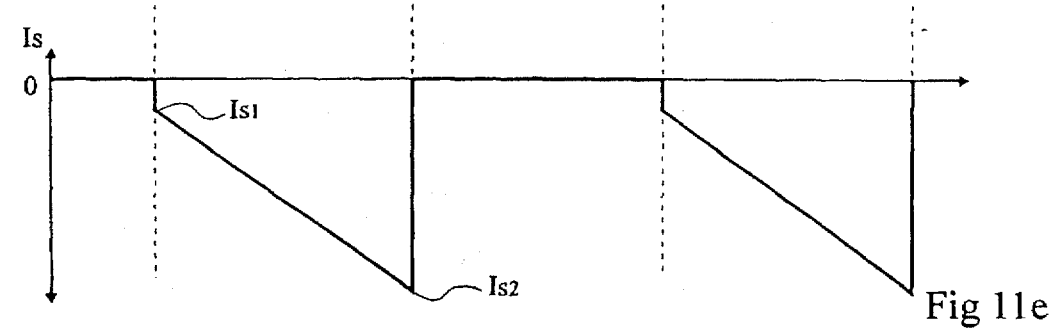

FIG. 12 represents an exemplary embodiment of the circuits 70 and 80 according to the third alternative.

The circuit 70 includes a D-type flip-flop 71, and a comparator 72 which receives at its positive input the signal V(Ip) and at its negative input the signal G(ϵ). The input D of flip-flop 71 is maintained at 1, the reset input CL receives the output of the comparator 72, and the clock input CK receives the signal S(T4') provided by the circuit 80. The control signal Hp of switch Tp is transmitted by an inverting cell 73 receiving at its input the inverted output $\overline{Q}$ of the flip-flop. The output $\overline{Q}$ is also applied at the input of a delay line 74 providing the signal S(T2'). The delay line 74 copies at its output, with a delay T2', the signal received at its input.

The circuit 80 includes a D-type flip-flop 81 and a circuit 82, for calculating T3 according to equation (12) and providing a signal S(T3) when T3 is ended. For this purpose, the circuit 82 receives at its input the input voltage Vin, the output voltage Vout, and a reference voltage Vc which represents the current reference Ioutmax. The circuit 82 further receives at its input the signal S(T2') provided by circuit 70, and the output Q of flip-flop 81. Last, flip-flop 81 is connected as follows. Input D is maintained at 1, input CL receives the signal S(T3) provided by the circuit 82, the clock input CK receives the signal S(T2'). The reverse output $\overline{Q}$ is applied to a delay line 83 having a delay T4' which provides S(T4'), and to an inverting cell 84 which provides the signal Hs controlling the switch Ts.

Circuits 70 and 80 operate as follows. At arrival of a rising edge of signal S(T4'), the D flip-flop 71 duplicates at its output Q the input D which is at 1. The output $\overline{Q}$ is set to 0 and Hp is set to 1, which switches-on switch Tp. When the current Ip in the converter is such that V(Ip) becomes higher than G(ϵ), the output of the comparator 72 is set to 1 and the output Q of the flip-flop 71 is reset. The output $\overline{Q}$ is set to 1, the switch Tp switches-off. This corresponds to the end of the period T1. The voltage rising edge which occurred at $\overline{Q}$ when set to 1 crosses the delay line 74 and reaches with a delay T2' the input CK of flip-flop 81 and circuit 82. This rising edge is the signal S(T2'). The output $\overline{Q}$ of the flip-flop 81 is set to 0, the signal Hs is set to 1 (the switch Ts is switched on) and the circuit 82 begins to count period T3. When period T3 is ended, the circuit 82 provides a rising edge at its output S(T3). The flip-flop 81 is reset, Hs is set to 0 and the switch Ts is switched-off. This is the end of period T3. A voltage rising edge provided by the output $\overline{Q}$ of the flip-flop 81 is transmitted in the delay line 83 until it reaches flip-flop 71 with a delay T4'. This rising edge corresponds to the signal S(T4') and causes a new cycle to startup.

Figure 13:
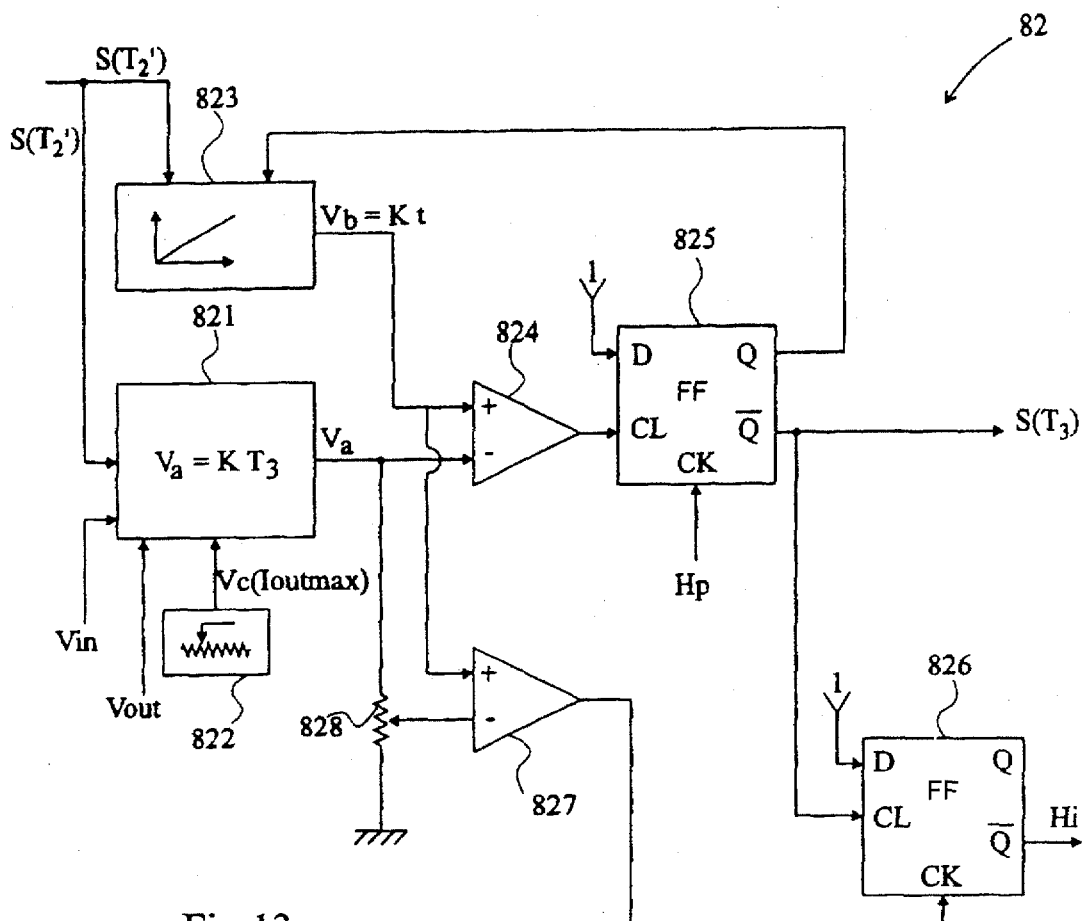

An exemplary embodiment of the circuit 82 is illustrated in FIG. 13. Upon reception of a rising edge of S(T2'), a circuit 821 calculates time T3 according to the relation (12)

and receives, for this purpose, Vin, Vout, and the reference value Vc (Ioutmax). It provides a fixed voltage Va=K*T3, K being a constant. A rising edge S(T2') triggers also in a circuit 823 the generation of a voltage ramp Vb=L*t, t being the time. Va and Vb are compared in a comparator 824 whose output drives the reset input CL of a D flip-flop 825, whose input D is maintained at 1 and the clock input CK receives the signal Hp (equivalent to the output $\overline{Q}$ of the flip-flop 71 of circuit 70). The inverting output $\overline{Q}$ of the flip-flop 825 provides the signal S(T3) and the output Q is applied to the circuit 823 to reset the ramp Vb.

These various circuits whose achievement is known by those skilled in the art will no more be described. Particularly, the circuit 821 which calculates T3 according to the equation (12) can be conventionally achieved, with voltage multipliers and dividers.

In the control system above described, the reference Vc (Ioutmax) provided to the circuit 821 can be selected by the user, who can calibrate the converter depending upon the desired application. For example, if it is known that the load will consume a low current (Iout), it is advantageous to adjust the Vc at a low value so that the efficiency of the converter is maximum. The above relation (11) shows that the decrease of the reference Ioutmax corresponds to a decrease of the current ramp ΔIs and as a consequence to a decrease of the losses by Joule effect in the converter. The proposed solution shown in FIG. 13 consists in adjusting Vc through a potentiometer 822.

Referring now to the diagrams 4c and 4d of FIG. 4, it can be seen that the durations of the periods T2 and T4 are determined by the charging or discharging duration of the smooth switching capacitors Cp and Cs, whereas T2' and T4' are determined by the circuits 70 and 80. In the exemplary embodiment above described, T2' and T4' are determined by the delay lines 74 and 83, and will be preferably selected in accordance with the following rules:

T2' and T4' must be substantially higher than T2 and T4 so that diodes Dp or Ds are in the conductive state before the switching-on of the switches Tp or Ts, and so that switching losses are avoided at the switching-on.

in addition, T2' and T4' must be very close to T2 and T4, so that switches Tp or Ts are switched-on as soon as possible after the diode Dp or Ds with which they are associated is conductive. Accordingly, the current first flows through the switches and the Joule losses are decreased, whereby the efficiency increases, the voltages of the switches, of approximately 0.2 to 0.3 volt in the case of MOS switches, being lower than the voltages of the diodes of approximately 0.6 to 1 volt.

In practice, to select T2' and T4', a previous estimation of T2 and T4 can be obtained from the following relations:

$$T2=(Vin+NpsVout)(Cp+Nsp^2Cs)/Ip2 \quad (13),$$

$$T4=(NspVin+Vout)(Nsp^2Cp+Cs)/-Is2 \quad (14),$$

where Nsp is the ratio Ns/Np and Nps is the ratio Np/Ns.

A drawback may occur under some operation conditions, especially in the case where important variations of the input voltage Vin can occur, or when the output voltage Vout is significantly modified by a suitable adjustment of Vref. Under such operation conditions, it can be difficult to find steady values for T2' and T4' which will be satisfying in all circumstances, since the actual values T2 and T4, defined by the relations (13) and (14), depend upon Vin and Vout and are liable to vary.

Figure 14A:
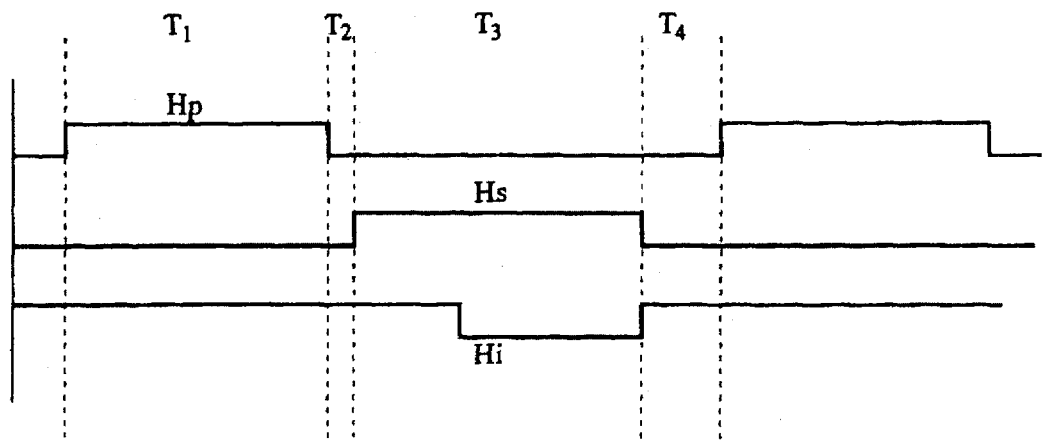
FIG. 14a represents electrical signals provided by the control system of FIG. 10.
Figure 14B:
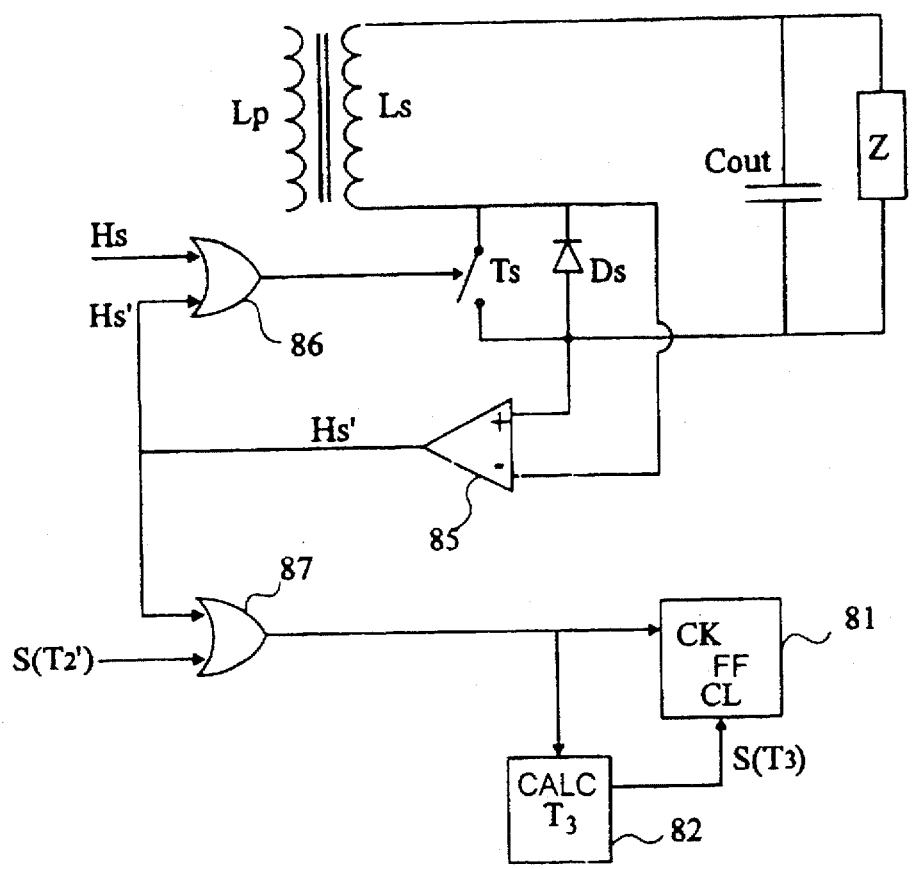
FIG. 14b represents a device added to the converter of FIG. 10.

A first solution to avoid the risks associated with an excessive difference between T2' and T4' and the actual values T2, T4 imposed by the operating conditions of the converter is illustrated in FIG. 14b. For the sake of simplicity, FIG. 14b represents only the secondary side of the converter 60. A comparator 85 whose positive input is connected to the anode and the negative input to the cathode of the diode Ds, provides a signal Hs'. The signal Hs' is added to the signal Hs which controls the secondary switch Ts through an OR gate 86 whose output controls the switch Ts. When the "true" period T2 is ended, the voltage across the diode Ds is inverted and Ds becomes conductive. The voltage across Ds, although it is close to 0 (from −0.6 to −1 volt), is sufficient to trigger the comparator 85 whose output Hs' is set to 1. Thus, when Ds becomes conductive, Hs' anticipates the switching-on of Ts if Hs is not yet to 1. Of course, an equivalent device can be added in the primary circuit, to ensure the anticipated switching on of Tp. In addition, as shown in FIG. 14b is, the signal Hs' can be added to the signal S(T2') through an OR gate 87, whose output replaces signal S(T2') and drives the flip-flop 81 and the circuit 82 above described. This device enables to synchronize the start-up of the calculation of T3 with the anticipated switching-on of Ts. However, it should be noted that generally these synchronization problems to calculate T3 are not important in practice, because times T2, T2', T4, T4', of approximately one hundredth of a nanosecond, are very short with respect to T1 and T3, approximately one microsecond. Thus, a shift of a few tenths of a nanosecond between T2' and T2 or T4' and T4 would be insignificant with respect to the duration of T1 or T3.

By way of alternative to the solution described above, the present invention provides a method consisting of replacing the delay lines 74 and 83 of FIG. 12 by circuits calculating T2' and T3' in real time according to the above relations (13) and (14). In relation (13), it can be seen that the three parameters needed to calculate T2' are Vin and Vout, already used to calculate T3, and Ip2. With the process for controlling the switching-on of the primary switch Tp provided by the invention, Ip2 is given by the equation V(Ip2)=G(ε) (comparator 72 of FIG. 12 is set to 1 indicating the end of period Ti). Thus, all the parameters for calculating T2' are available. To calculate T4', it can be seen that the relation (14) depends upon the current Is2, which is the maximum negative current flowing in the secondary at the end of period T3. It is not desired to measure the current Is2 at the secondary, but since ΔIs=Is1−Is2, one obtains:

$$Is2=Is1-\Delta is \quad (15).$$

ΔIs is obtained from equation (2):

$$\Delta Is=Is1-Is2=Vout*T3/Ls \quad (2),$$

Vout and T3 being known and Ls being a constant.
In addition Is1 is obtained from the following equation $$Is1=NpsIp2 \quad (16),$$

Ip2 being known and Nps being a constant.

Thus, T4' can also be defined by equation (14) from the parameters Vin, Vout, Ip2, T3 which are known.

Figure 15:
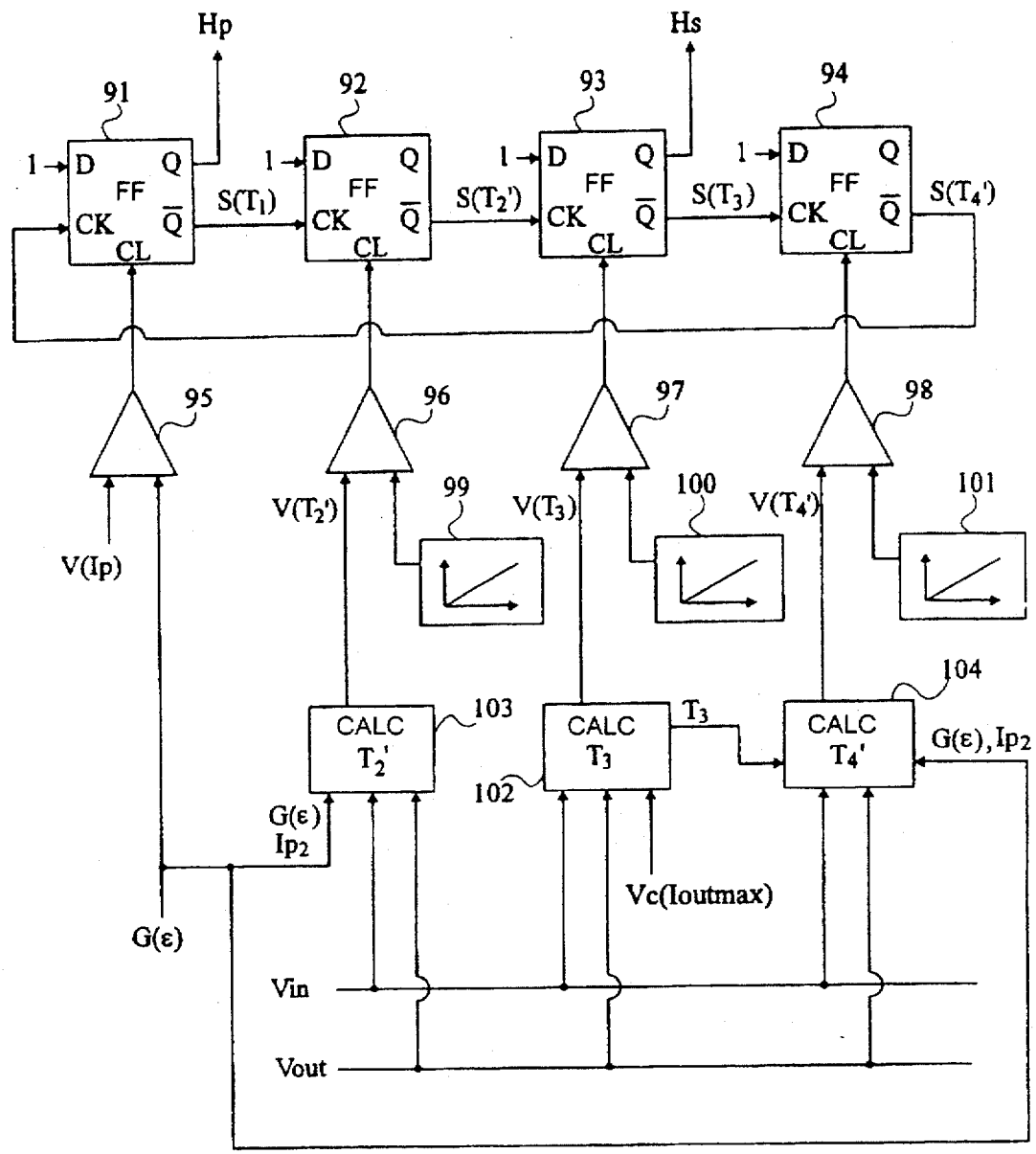
FIG. 15 represents an alternative embodiment of the control system of FIG. 10.

FIG. 15 is a simplified representation of an embodiment of a control system 90 in which T2', T3 and T4' are determined by calculation. The control system 90 represents the equivalent of circuits 70 and 80 of FIG. 10. The control system includes four cascaded D flip-flops 91, 92, 93, 94, respectively, each having a D input maintained to 1. The inverted output $\overline{Q}$ of the flip-flop 91 provides a signal S(T1) indicating the end of period T1 and drives the clock input CK of flip-flop 92. The output $\overline{Q}$ of flip-flop 92 provides a signal S(T2') and drives the input CK of the flip-flop 93 whose output $\overline{Q}$ provides S(T3) and drives the input CK of the last flip-flop 94. Last, the output $\overline{Q}$ of flip-flop 94 provides S(T4') which is connected to the input CK of the first flip-flop 91. In addition, the output Q of the first flip-flop provides the control signal Hp, and the output Q of the third flip-flop 93 provides the control signal Hs. Each clear input CL of flip-flops 91, 92, 93 and 94 is driven by the output of a comparator, 95, 96, 97 and 98, respectively. The comparator 95 receives the voltage V(Ip) and the control signal G($\epsilon$), according to the above described method for controlling the switching-on of Tp. The comparator 96 compares voltage V(T2') which represents T2' with a voltage ramp provided by a circuit 99. The comparator 97 compares voltage V(T3) which represents T3 with a voltage ramp provided by a circuit 100. Last, the comparator 98 compares voltage V(T4') which represents T4' with a voltage ramp provided by a circuit 101. Voltage V(T3) is provided by a circuit 102 identical to the circuit 821 of FIG. 13. Voltage V(T2') is provided by a circuit 103 which achieves the above relation (13), and voltage V(T4') is provided by a circuit 104 which achieves relation (14). For this purpose, the circuit 103 receives Vin, Vout and Ip2 (i.e., G($\epsilon$)), and the circuit 104 receives Vin, Vout, Ip2 and T3, T3 being provided by the circuit 102. The operation of the system is based on the same principle as that described above, except that T2' and T4' are obtained by calculation. The advantage lies in that, in case of large variations of the input voltage Vin or of a significant modification of the output voltage Vout, the control system according to the invention follows the new operation conditions by calculating values T2', T4' very close to T2 and T4.

Those skilled in the art will notice that various improvements can be made to the control system according to the invention. Particularly, an improvement consists of increasing the accuracy of the various equations which control the switches. For example, in the above equation (7), T2 and T4 are not taken into account, whereas this relation could be expressed by:

$$Iout=\frac{1}{2}(Is1+Is2)*T3/(T1+T2+T3+T4) \qquad (17)$$

By using in equation (17) the expressions of T2 and T4 obtained from equations (13) and (14), a more complete expression of T3 is obtained which can, like equation (12), be achieved by an electronic circuit.

Furthermore, the control system according to the invention can be simplified, for low cost applications in which the efficiency of the converter is of less importance. Then, it is possible to eliminate the smooth switching capacitors Cp and Cs, and to provide for times T2' and T4' to be close to 0. In the embodiment of FIG. 12, this arrangement is achieved by eliminating the delay lines 74 and 83. The converter will have higher switching losses, with the advantage of being simpler to achieve while accepting important variations of Vin and making it possible to adjust Vout according to a larger range of values. In an alternative, the spurious capacitors of the MOS transistors can be used as smooth switching capacitors.

Those skilled in the art will further notice that the control system described above does not specifically apply to a fly-back converter like the converter of FIG. 10, but generally relates to any bidirectional converter with load transfer. The present invention can actually be applied to the buck-boost converter of FIG. 8, to the converter of FIG. 9a, or to the converter with a plurality of outputs of FIG. 9b. In the case of a buck-boost converter (FIG. 8), the above relations can be used assuming that Ns/Np=1. In the case of the converter with a plurality of outputs of FIG. 9b, an alternative embodiment consists of adding secondary switches in the secondary circuits 304 and 305 and to control them simultaneously with the switch Ts of the secondary circuit 303, as if the secondary of the converter included a single switch.

The sensor 62 of FIG. 10 will now be described.

Bidirectional Current Sensor

Figure 16:
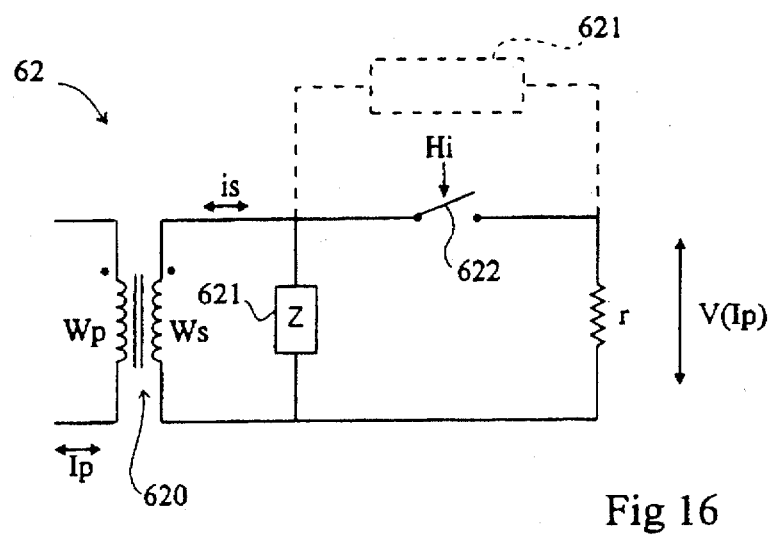
FIG. 16 represents the electrical diagram of a current sensor according to the invention.

FIG. 16 represents a current sensor 62 according to the present invention. The current sensor 62 conventionally includes a transformer 620 having a primary winding Wp in which flows the current Ip to be measured, a secondary winding Ws, a measurement resistor r, and a demagnetizing impedance 621, for example a high value resistor or a Zener diode. Conventionally, the sensor provides an output voltage V(Ip) equal to r*is, where is is the secondary current in winding Ws. According to the invention, a switch 622 controlled by a signal Hi is disposed between the resistor r and the winding Ws. Thus, when the polarity of the current Ip to be measured changes in the primary winding Wp, the switch 622, if switched-on, does not prohibit the change of polarity of the secondary current is, and the polarity of the output voltage V(Ip) is inverted. The sensor according to the invention has the advantage of being bidirectional. A further advantage is that the risk of a rapid demagnetization of the magnetic core of the transformer 620 is avoided, because a current can flow through the secondary winding Ws independently of the direction of the current in the primary winding Wp. Of course this advantage is obtained provided that the control Hi is realized so that the switch 622 is always switched-on when a current flows through the primary winding Wp. As regards the arrangement of the impedance 621 in the sensor, it should be noted that the impedance can be connected across winding Ws, or across switch 622 as represented in doted lines in FIG. 16.

Although risks for fast saturation are decreased, the sensor 62 however requires a quiescent period so that the transformer 620 can be demagnetized. During the quiescent period, the switch 622 must be switched off and no current should flow in the primary winding Wp. This feature of the sensor will be better understood with relation to FIG. 17.

Figure 17:
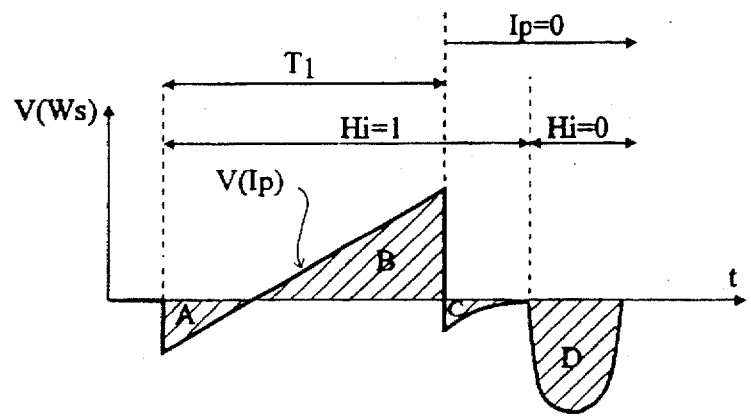
FIG. 17 illustrates the operation of the current sensor of FIG. 16.

FIG. 17 represents the voltage V(Ws) across the secondary winding Ws during an operation cycle of the converter of FIG. 10. During period Ti, the switch 622 is switched-on (Hi=1), the voltage V(Ws) is equal to the output voltage V(Ip) of the sensor. V(Ip) duplicates the current Ip and has the shape of a ramp, which is first negative (A) when Ip is negative, then positive (B) when Ip is positive. When Ip is zero (end of the period Ti), voltage V(Ip) is reset, but a magnetization current generated in the transformer 620 during the measurement phase remains in the winding Ws. If switch 622 is maintained on, this magnetization current flows through resistor r, and generates across Ws a negative and decreasing demagnetization voltage having a low value (C). In FIG. 16, reference "A" represents the surface area (in volts-seconds) of the negative portion of the voltage ramp due to negative current Ip, "B" represents the surface area of the voltage ramp due to the positive current Ip, and "C" the surface area of the demagnetization voltage. Because of the transformers' properties, if the switch 622 is maintained on, the demagnetization of the sensor will be achieved when:

C=B–A, i.e. when the positive and negative surfaces of the voltage generated in the secondary winding are mutually canceled. Since the demagnetization current is low and decreasing, the surface "C" increases very slowly. If switch 622 is maintained on, the transformer 620 may not be fully demagnetized at the beginning of the next cycle (T1). Therefore, it is more advantageous to accelerate the demagnetization phenomenon by switching-off switch 622 (Hi=0), so that the demagnetization current flows through the high value impedance 621. Then, across the secondary winding Ws, appears a higher voltage, with a short duration, with a surface area D equal to

D=B−(A+C)

In a system such as the converter described with relation to FIGS. 11–15, a control signal Hi of the switch 622 can be easily generated, because there is a relation between the control of switches Tp and Ts and the flow of current Ip. An example is given in FIG. 13. The circuit 82 above described further includes a flip-flop 826 whose D input is at 1. The clear input CL of this flip-flop receives the output $\overline{Q}$ of flip-flop 825, the clock input CK receives the output of a comparator 827. The comparator 827 receives at its positive input the voltage ramp Vb provided by the circuit 823, and at its negative input a portion of voltage Va provided by the circuit 821, applied through a voltage divider bridge 828. The output $\overline{Q}$ of flip-flop 826 provides the control signal Hi of the current sensor 62. FIG. 14a represents the shape of signals Hp and Hs for the switches Tp and Ts of the converter, as well as the signal Hi for controlling the sensor 62. It can be seen that Hi is at 0 for a portion of period T3. Referring again to FIG. 13, it can be seen that signal Hi is reset at the moment when the voltage ramp Vb becomes equal to the portion of Va applied to the comparator 827, and is set back to 1 when signal S(T3) is emitted (switching off of Tp). Thus, when Hi is at 0 and when switch 622 is off, current Ip is still zero and the sensor can be demagnetized. The duration of the demagnetization phase can be adjusted by the voltage divider 828.

Figure 18:
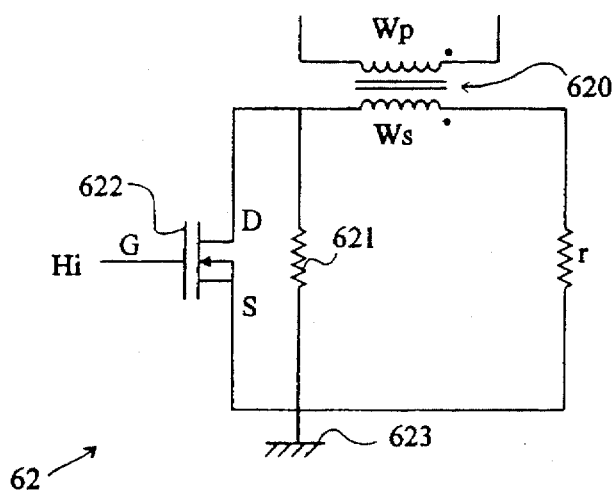
FIG. 18 represents a specific embodiment of the current sensor of FIG. 16.

FIG. 18 represents a specific embodiment of sensor 62. The switch 622 is a 2N7002 MOS transistor, having its gate driven by signal Hi, its drain connected to Ws, and its source S connected to the measurement resistor r. The impedance 621 is a resistor of approximately 10 kΩ, and the measurement resistor r is approximately 10 Ω. The primary winding Wp has a single turn and the secondary winding Ws has 200 turns. The impedance 621 is connected in parallel to the terminals of switch 622, the voltage reference 623 of the sensor being present between the resistor r and the source S of the MOS transistor 622.

As is apparent to those skilled in the art, the current sensor according to the invention can have various applications different from those above mentioned. Generally, such a sensor can be used to periodically measure a current in any controlled circuit in which there is a relation between the current flow and the state of the circuit control system, from which it will be possible to generate an on/off signal for the sensor switch.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

I claim:

1. A method for controlling a voltage converter (30, 40, 50, 60, 300) of the type comprising:
    an inductive element (1, Lp, Ls) adapted to store energy in a magnetic form,
    a first chopping switch (Tp) and a first diode (Dp) in parallel, forming with the inductive element (Lp) a primary circuit connected to a DC supply voltage source (Vin),
    at least a second chopping switch (Ts) and a second diode (Ds) in parallel, forming with the inductive element (Ls) at least a secondary circuit providing a load (Cout, Z) with an output voltage (Vout) of the converter,
    said method comprising the steps of
    controlling said switches (Tp, Ts) to achieve operation cycles of the converter so that each cycle includes a primary period (T1) during which the first switch (Tp) is on and the second switch (Ts) is off, and a secondary period (T3) during which the second switch (Ts) is on and the first switch (Tp) is off,
    determining the duration of the secondary period (T3) by a calculation means, and
    triggering the switching-off of the secondary switch (Ts) when the calculated duration of the secondary period (T3) is ended;
    wherein the duration of the primary period (T1) is determined by the switching-off of the first switch (Tp) which is triggered when a current (Ip) in the primary circuit is higher than a control signal (G(ε)) depending upon the difference (ε) between the output voltage of the converter (Vout) and a reference voltage (Vref).

2. The method of claim 1, wherein the step of determining the duration of the secondary period (T3) further comprises calculating the secondary period from a set of parameters including at least a parameter (Vin#, Vin) representative of the supply voltage (Vin), a parameter (Vout#, Vout) representative of the output voltage (Vout) of the converter, and a value (Vc) of a maximum current (Ioutmax) at the output of the converter.

3. The method of claim 2, wherein said parameter representative of the supply voltage is the supply voltage drawn at the converter input (Vin).

4. The method of claim 2, wherein said parameter representative of the output voltage of the converter is the voltage drawn at the output of the converter (Vout).

5. The method of claim 1, wherein:
    a first delay (T2') is interposed between the end of the primary period (T1) and the beginning of the secondary period (T3), the switching-on of the second switch (Ts) and the counting of the duration of the secondary period (T3) being triggered at the latest at the end of the first delay,
    a second delay (T4') is interposed between the end of the secondary period (T3) and the beginning of the primary period (T1), the switching-on of the first switch (Tp) being triggered at the latest at the end of said second delay.

6. The method of claim 5, wherein said delays (T2', T4') are predetermined and produced by delay circuits (74, 83).

7. The method of claim 5, wherein delays (T2', T4') are calculated from a set of parameters including the converter supply voltage (Vin), the converter output voltage (Vout), the value of the current (Ip2) flowing through the primary circuit at the end of the primary period (T1), and the duration (T3) of the secondary period.

8. A voltage converter (30, 40, 50, 60, 300) including:
    an inductive element (1, Lp, Ls) adapted to store energy in a magnetic form,
    a first chopping switch (Tp) and a first diode (Dp) in parallel, which form with the inductive element a primary circuit connected to a DC supply voltage source (Vin), at least a second chopping switch (Ts) and a second diode (Ds) in parallel, which form with the inductive element at least a secondary circuit supplying a load (Cout, Z) with a converter output voltage (Vout), a system (70, 80, 90) for controlling said switches to achieve operation cycles including a primary period (T1) for the flowing of a current (Ip) through said primary circuit, during which the first switch (Tp) is on and the second switch (Ts) is off, and a secondary period (T3) for the flowing of a current (Is) through the secondary circuit during which the second switch (Ts) is on and the first switch (Tp) is off, means (61, 62, 70, 71, 72, 91, 95) for switching on the first switch (Tp) upon reception of a signal (S, T4') to start-up the primary period (Ti), and for switching off the switch when the current (Ip) in the primary circuit is higher than a control signal (G(ε)) depending upon the difference (ε) between the converter output voltage (Vout) and a reference voltage (Vref), means (80, 81, 82, 85, 86, 87, 93, 97, 100, 102) for switching on the second switch (Ts) upon reception of a signal (S(T2'), Hs') to start-up the secondary period (T3), to calculate the duration of the secondary period (T3), to count said duration and to switch-off the secondary switch (Ts) when said duration is ended.

9. The converter (60) of claim 8, further including:

a first timer (74, 92, 96, 99, 103) for providing with a first delay (T2') said start-up signal (S(T2')) f the secondary period T3), from the end (ST1) of the primary period (T1), a second timer (83, 94, 98, 101, 104) for providing with a second delay (T4') said start-up signal (S(T4')) of the primary period (T1), from the end (S(T3)) of the secondary period (T3).

10. The converter of claim 9, wherein a smooth switching capacitor (Cp, Cs) is associated with each of said switches (Tp, Ts), and wherein said smooth switching capacitor (Cp, Cs) is connected in parallel across the inductive element (1, Lp, Ls), so as to form, with a spurious inductance (lp, ls) of the inductive element, a circuit loop having a reduced length in which is confined a spurious current (Iop, Ios).

11. The converter of claim 8, further comprising:

a current sensor (62) for measuring the primary current (Ip), said sensor (62) including a transformer (620) having a primary winding (Wp) disposed in the primary circuit of the converter, a secondary winding (Ws) connected to a measurement resistor (r) through a switch (622), and a demagnetization inductance (621) that is active when said switch (622) is off, and means (826, 827, 828) for switching-on said switch (622) during said primary period (T1).

12. The converter of claim 8, wherein said inductive element is a single turn winding (L).

13. The converter of claim 8, wherein said inductive element is a transformer (1) including a primary winding (Lp) forming with the first switch (Tp) and the first diode (Dp) said primary circuit, and a secondary winding (Ls) forming with the second switch (Ts) and the second diode (Ds) said secondary circuit.

14. The voltage converter of claim 8, wherein the duration of the secondary period (T3) is calculated from a set of parameters including at least a parameter (Vin#, Vin) representative of the supply voltage (Vin), a parameter (Vout#, Vout) representative of the output voltage (Vout) of the converter, and a value (Vc) of a maximum current (Ioutmax) at the output of the converter.

15. The converter of claim 14, wherein said parameter representative of the supply voltage is the supply voltage drawn at the converter input (Vin).

16. The converter of claim 14, wherein said parameter representative of the output voltage of the converter is the voltage drawn at the output of the converter (Vout).

17. The converter of claim 9, wherein said delays (T2', T4') are predetermined and produced by delay circuits (74, 83).

18. The converter of claim 9, wherein said delays (T2', T4') are calculated from a set of parameters including the converter supply voltage (Vin), the converter output voltage (Vout), the value of the current (Ip2) flowing through the primary circuit at the end of the primary period (T1), and the duration (T3) of the secondary period.

* * * * *